US012454933B2

(12) United States Patent
Borigas et al.

(10) Patent No.: US 12,454,933 B2
(45) Date of Patent: Oct. 28, 2025

(54) APPARATUS FOR EXTRACTING POWER FROM WATER WAVES

(71) Applicant: Buogra Limited, Central (HK)

(72) Inventors: Edgardo Jr. Lolo Borigas, Kowloon (HK); Mary Anne Roque Borigas, Kowloon (HK)

(73) Assignee: Buogra Limited, Central (HK)

( * ) Notice: Subject to any disclaimer, the term of this patent is extended or adjusted under 35 U.S.C. 154(b) by 0 days.

(21) Appl. No.: 18/790,988

(22) Filed: Jul. 31, 2024

(65) Prior Publication Data

US 2024/0392739 A1    Nov. 28, 2024

Related U.S. Application Data

(63) Continuation-in-part of application No. 18/252,987, filed as application No. PCT/IB2022/051153 on Feb. 9, 2022.

(30) Foreign Application Priority Data

Feb. 10, 2021    (HK) ........................... 32021025691.5

(51) Int. Cl.
*F03B 13/16*    (2006.01)
*F03B 13/14*    (2006.01)
(Continued)

(52) U.S. Cl.
CPC .............. *F03B 13/16* (2013.01); *F03B 13/14* (2013.01); *F03B 13/18* (2013.01); *F03B 13/20* (2013.01);
(Continued)

(58) Field of Classification Search
CPC .......... F03B 13/14; F03B 13/16; F03B 13/18; F03B 13/1805; F03B 13/181;
(Continued)

(56) References Cited

U.S. PATENT DOCUMENTS 4,438,343 A * 3/1984 Marken .................. F03B 13/16
60/507
4,686,377 A    8/1987 Gargos
(Continued)

FOREIGN PATENT DOCUMENTS

CN    1303995 A    7/2001
CN    1798922 A    7/2006
(Continued)

*Primary Examiner* — Loren C Edwards
(74) *Attorney, Agent, or Firm* — Hinckley Allen & Snyder; Stephen Holmes

(57) ABSTRACT

An apparatus for extracting power from water waves comprises one or more pairs of interconnected buoyant members that move relative to each other when subjected to wave kinetic energy. Each pair is connected by a universal joint allowing rotation about first and second axes. Coaxial bevel gears are configured to rotate about these axes, with each pair consisting of gears restricted to opposite rotational directions. The apparatus includes a gear system linked to the bevel gears, enhancing rotational velocity. A drive shaft, connected to the gear system, rotates to power an electric generator. This configuration ensures continuous electricity generation from the movement of interconnected buoyant members, regardless of the direction of their relative movement.

22 Claims, 21 Drawing Sheets

(51) Int. Cl.
*F03B 13/18* (2006.01)
*F03B 13/20* (2006.01)

(52) U.S. Cl.
CPC ....... *F05B 2260/5032* (2013.01); *Y02E 10/30* (2013.01)

(58) Field of Classification Search
CPC .... F03B 13/1815; F03B 13/182; F03B 13/20; Y02E 10/20; Y02E 10/30; F05B 2260/4031; F05B 2260/421; F05B 2260/5032
See application file for complete search history.

(56) References Cited

U.S. PATENT DOCUMENTS

| | | | |
|---|---|---|---|
| 6,247,308 B1 * | 6/2001 | Solell | F03B 13/1815 74/125.5 |
| 6,476,511 B1 | 11/2002 | Yemm | |
| 9,115,689 B2 * | 8/2015 | Malligere | F03B 13/20 |
| 2010/0319340 A1 | 12/2010 | Wickett | |
| 2011/0031751 A1 | 2/2011 | Yang | |
| 2015/0130190 A1 | 5/2015 | Malligere | |

FOREIGN PATENT DOCUMENTS

| | | |
|---|---|---|
| CN | 201169527 Y | 12/2008 |
| CN | 101490409 A | 7/2009 |
| CN | 201277140 Y | 7/2009 |
| CN | 102384013 A | 3/2012 |
| CN | 103590967 A | 2/2014 |
| CN | 206092279 U | 4/2017 |
| CN | 111140423 A | 5/2020 |
| CN | 110454318 B | 4/2021 |
| WO | 2011047418 A1 | 4/2011 |
| WO | 2015119401 A1 | 8/2015 |
| WO | 2020264103 A1 | 12/2020 |

* cited by examiner

APPARATUS FOR EXTRACTING POWER FROM WATER WAVES

CROSS-REFERENCE TO RELATED APPLICATIONS

This application is a continuation-in-part application of U.S. application Ser. No. 18/252,987 filed May 15, 2023, which is a Section 371 National Stage filing of PCT Application No. PCT/IB2022/051153 filed Feb. 9, 2022.

TECHNICAL FIELD

The present invention relates to an apparatus for extracting power from water waves, commonly referred to as a wave energy converter (WEC).

BACKGROUND OF THE INVENTION

The kinetic energy of ocean waves, which are formed by winds blowing over the surface of the seas and oceans, may be harnessed to generate vast amounts of clean electricity to help satisfy humankind's growing energy needs without adding greenhouse gases into the atmosphere. This kinetic energy may be harnessed by so-called wave energy converters.

Wave energy converters are known and have been in use in various forms for many decades. Such WECs include attenuators and point absorbers. An attenuator type WEC is a floating device comprising two or more pivotally connected buoyant bodies that operate parallel to the wave direction and capture energy from the relative motion of the two connected buoyant bodies as the wave passes them. One example of an attenuator is disclosed in U.S. Pat. No. 882,883 which describes two pivotally connected buoyant bodies that drive corresponding gears when a wave passes for the generation of power.

A point absorber type WEC is a floating structure that may absorb wave energy from all directions through the movement of the float at or near the water surface. The point absorber converts the motion of the buoyant top relative to the base into electrical power. One example of a point absorber is disclosed in U.S. Pat. No. 7,245,041 which describes a wave energy converter comprising a plurality of floats each attached to a submerged beam via a cable and operable to convert wave energy into mechanical or hydraulic energy upon passing of a wave and movement of each of the floats relative to the beam.

There are other examples of wave energy converters that are capable of converting kinetic energy of the waves into useful power. U.S. Pat. No. 4,541,242 describes an apparatus for deriving energy from the rise and fall of a body of liquid to drive a rotatable drive shaft associated with a power generator. In this arrangement, a float means is adapted to move substantially in a vertical plane in response to the rise and fall of the body of liquid and a system of shafts and gear trains is configured to convert this vertical movement into a rotational movement that is used to raise a weight against the action of gravity and to drive a power generator for the generation of electricity.

Chinese patent no. CN103590967B describes a WEC comprising a paddle connected to a power transmission device that drives a shaft upon movement of the paddle when the paddle is at least partially submerged in water and subjected to one or more waves.

An enhanced version of an attenuator type WEC is disclosed in US20150203183A1 which describes a WEC comprising a plurality of linearly ordered, connected buoyant segments that are configured to enable the connected segments to articulate relative to each other in at least one degree of freedom. The WEC harvests mechanical energy from ambient waves by means of the articulation of the segments and converts the mechanical energy into electrical energy that powers a propulsion mechanism. The segments may be connected via universal joints to allow two or more degrees of freedom so that more of the kinetic energy of a wave can be converted into electrical energy.

A further version of an apparatus for extracting energy from sea/ocean waves is described in U.S. Pat. No. 6,476,511. This also describes an attenuator type WEC comprising a plurality of cylindrical buoyant members connected end to end via corresponding universal joints. Relative movement of the connected members drives a series of hydraulic rams which form part of a hydraulic circuit that includes corresponding hydraulic motors that drive an electrical generator to produce electricity or a useful by-product such as hydrogen or desalinated water.

Problems with this type of WEC, which use a hydraulic power take off (PTO), include that they require high maintenance, particularly in hostile environments such as the ocean, that the stroke of the hydraulic cylinder for pumping hydraulic fluid is limited, thus limiting the degree to which the buoyant members can flex relative to one another and thereby placing the WEC at risk of damage when subjected to extreme waves reaching a gradient of up to 45 degrees or more that may exceed the maximum flex angle of this type of WEC, and also that the dimensions of this type of WEC that inherently use large hydraulic components cannot be easily reduced so as to work in relatively calmer waters with smaller incident waves.

In view of the above, there is a need for an improved WEC that overcomes these limitations.

SUMMARY OF THE INVENTION

According to a first aspect of the present invention, there is provided an apparatus for extracting power from water waves, comprising:
  one or more pairs of interconnected buoyant members configured for relative movement when subjected to kinetic energy from water waves;
  each pair of interconnected buoyant members being connected by a universal joint permitting rotation between the interconnected buoyant members about a first axis of rotation and a second axis of rotation;
  at least one pair of coaxial bevel gears configured to rotate about the first axis of rotation of each universal joint; and
  at least one pair of coaxial bevel gears configured to rotate about the second axis of rotation of each universal joint;
  wherein each pair of coaxial bevel gears comprises:
  a first bevel gear configured to rotate in a first direction within its respective plane of rotation and restricted from rotating in a second direction opposite the first direction within said plane; and
  a second bevel gear configured to rotate in the second direction within its respective plane of rotation and restricted from rotating in the first direction within said plane;
  the apparatus further comprising at least one gear system connected to each bevel gear pair, such that rotation of a bevel gear of at least one bevel gear pair drives the gear system, the gear system configured to increase the rotational velocity imparted by each bevel gear pair;

a drive shaft connected to the gear system and configured to rotate upon activation of the gear system;

at least one electric generator operatively connected to the drive shaft for generating electricity upon rotation of the drive shaft;

wherein the apparatus is configured such that relative movement between the interconnected buoyant members about the first axis of rotation or the second axis of rotation of each universal joint causes at least one bevel gear of a corresponding bevel gear pair to rotate and drive the gear system to rotate the drive shaft and generate electricity continuously, regardless of the direction of the relative movement between the interconnected buoyant members.

Advantageously, an apparatus according to the first aspect enables efficient energy conversion from wave motion by utilizing interconnected buoyant members and universal joints to harness kinetic energy regardless of the direction of the incident waves. The inclusion of coaxial bevel gears, restricted to opposite rotational directions, ensures reliable and continuous operation through consistent gear engagement.

Each bevel gear pair may be connected to the gear system by a rotatable element engaging with at least one bevel gear of the corresponding bevel gear pair. Two or more bevel gear pairs may be connected to the gear system by the same rotatable element. The rotatable element may comprises a rotatable shaft and one or more gears meshing arranged to mesh and engage with at least one bevel gear the bevel gear pairs to which the rotatable element is connected. The rotatable shaft may comprise two or more pivotally connected segments.

At least one segment may be telescopic so that the length of the telescopic segment is adjustable. Each telescopic segment comprises two or more concentric tubes and splines operable to limit relative rotational movement between concentric tubes so that the concentric tubes can slide relative to one another while transmitting torque. Each bevel gear pair of a universal joint of the one or more universal joints may be spaced apart about an intersection between the first and second axis of rotation of the corresponding universal joint.

The apparatus may comprise a plurality of interconnected buoyant members, each buoyant member pivotally connected to at least one adjacent buoyant member about at least one axis of rotation defined by a corresponding universal joint.

According to a second aspect of the present invention, there is provided a universal joint for an apparatus that extracts power from water waves, comprising:

interconnected buoyant members configured for relative movement when subjected to kinetic energy from water waves;

the universal joint connecting the interconnected buoyant members and permitting rotation between the interconnected buoyant members about a first axis of rotation and a second axis of rotation;

the universal joint further comprising at least one pair of coaxial bevel gears configured to rotate about the first axis of rotation;

and at least one pair of coaxial bevel gears configured to rotate about the second axis of rotation;

wherein each pair of coaxial bevel gears comprises:

a first bevel gear configured to rotate in a first direction within its respective plane of rotation and restricted from rotating in a second direction opposite the first direction within said plane; and a second bevel gear configured to rotate in the second direction within its respective plane of rotation and restricted from rotating in the first direction within said plane;

the universal joint further comprising a rotatable element engaging with at least one bevel gear of each pair of coaxial bevel gears;

wherein the universal joint is configured such that relative movement between the interconnected buoyant members about the first axis of rotation or the second axis of rotation causes one bevel gear of a corresponding bevel gear pair to rotate and cause the rotatable element to rotate continuously in a single direction, regardless of the direction of the relative movement between interconnected buoyant members.

Each pair of coaxial bevel gears may be spaced apart about an intersection between the first and second axis of rotation.

The rotatable element may comprise a rotatable shaft and one or more drive gears arranged to mesh and engage with at least one bevel gear of the coaxial bevel gear pairs. The rotatable shaft may comprise two or more pivotally connected segments.

According to a third aspect of the present invention, there is provided an apparatus for extracting power from water waves comprising:

a first member pivotally connectable to an adjacent member about a first axis of rotation for relative movement between the first member and a pivotally connected adjacent member when the apparatus is subjected to kinetic energy of a water wave, the apparatus further comprising two pairs of coaxial bevel gears arranged to rotate about the first axis of rotation, wherein rotation of a first bevel gear of each pair of bevel gears is permitted in a first direction and restricted in a second direction opposite the first direction, and rotation of the second bevel gear of each pair of bevel gears is permitted in the second direction and restricted in the first direction opposite the second direction, the apparatus further comprising a first set of two rotatable shafts each arranged to extend in a direction substantially perpendicularly to the first axis of rotation, each rotatable shaft of the first set having a pinion at one end meshing with each bevel gear of a corresponding pair of bevel gears, the end of each rotatable shaft of the first set opposite the pinion end connected to a first gear system such that the two pairs of bevel gears are each linked to the first gear system by a corresponding rotatable shaft of the first set, said first gear system configured, in use, to increase the rotational velocity input to the first gear system by the connected rotatable shafts of the first set, the first gear system connected to a drive shaft housed within the first member, said drive shaft operable to rotate about an axis of rotation upon rotation of the first set of rotatable shafts and activation of the first gear system so as to drive an electric generator connected to the drive shaft, the apparatus further comprising a first plurality of coaxial flywheels housed within the first member and rotatable about the axis of rotation of the drive shaft, each flywheel of the first plurality connectable to the drive shaft and configured to store rotational energy upon rotation of the drive shaft, wherein the apparatus is configured such that, in use, upon relative movement between the first member and a pivotally connected adjacent member, one of the bevel gears of each pair of bevel gears associated with the first axis of rotation freewheels and the other bevel gear of each pair of bevel gears engages with the corresponding pinion to drive each rotatable shaft of the first set in the same direction regardless of the direction of rotation of the first member relative to the second member about the first axis of rotation so as to drive the first gear system, first plurality of flywheels and the electric generator for the generation of electricity.

Advantageously, by incorporating a direct mechanical drive power take-off into a wave energy converter, the size of the components may be adjusted across a wide range according to the dimensions of the apparatus so as to tailor the wave energy converter for use in a wide variety of different wave conditions and wave sizes. It is also easier and more economical to manufacture mechanical components than relatively more complex and expensive hydraulic components. Furthermore, for a wave energy converter of a specific size and dimension, electricity may be generated more efficiently through use of a direct mechanical drive power take-off when compared with a hydraulic power take-off. This is because a direct mechanical drive power take-off requires less components than a hydraulic power take-off for energy transfer from the wave to the generator and, therefore, suffers less energy loss due to heat and friction.

The first member may be pivotally connectable to an additional adjacent member about a second axis of rotation which is spaced apart from the first axis of rotation, the apparatus may further comprise two pairs of coaxial bevel gears arranged to rotate about the second axis of rotation, wherein rotation of a first bevel gear of each pair of bevel gears of the second axis of rotation is permitted in a first direction and restricted in a second direction opposite the first direction, and rotation of the second bevel gear of each pair of bevel gears of the second axis of rotation is permitted in the second direction and restricted in the first direction opposite the second direction, the apparatus may further comprise a second set of two rotatable shafts arranged to extend in a direction substantially perpendicularly to the second axis of rotation, each rotatable shaft of the second set having a pinion at one end meshing with each bevel gear of a corresponding pair of bevel gears associated with the second axis of rotation, the end of each rotatable shaft of the second set opposite the pinion end may be connected to a second gear system such that the two pairs of bevel gears associated with the second axis of rotation are each linked to the second gear system by a corresponding rotatable shaft of the second set, said second gear system configured, in use, to increase the rotational velocity input to the second gear system by the second set of rotatable shafts, the second gear system may be connected to a drive shaft housed within the first member, said drive shaft operable to rotate about an axis of rotation upon rotation of the rotatable shafts and activation of the gear system so as to drive an electric generator connected to the drive shaft, the apparatus may further comprise a second plurality of coaxial flywheels housed within the first member and rotatable about the axis of rotation of the drive shaft, each flywheel of the second plurality connectable to the drive shaft and configured to store rotational energy upon rotation of the drive shaft, and the apparatus may be configured such that, in use, upon relative movement between the first member and a pivotally connected adjacent member, one of the bevel gears of each pair of bevel gears associated with the second axis of rotation freewheels and the other bevel gear of each pair of bevel gears engages with the corresponding pinion to drive each rotatable shaft in the same direction regardless of the direction of rotation of the first member relative to the second member about the second axis of rotation so as to drive the gear system, one or more flywheels and the electric generator for the generation of electricity.

The second axis of rotation may be substantially parallel with, or substantially perpendicular to, the first axis of rotation.

The first gear system, the second gear system, the first and second pluralities of flywheels, and the at least one electric generator may be connected to the same drive shaft.

The first member may be pivotally connectable to an adjacent member about the first axis of rotation or the second axis of rotation by an intermediate piece forming each axis of rotation about which adjacent pivotally connected members may rotate. The intermediate piece may comprise at least one cross-pin forming an axis of rotation, and at least one pair of bevel gears may be arranged to rotate on a cross-pin of the intermediate piece. Each bevel gear of each pair of bevel gears may be associated with a one-way clutch configured to permit rotation of the associated bevel gear in a first direction and restrict movement of the bevel gear in a second direction opposite the first direction.

The apparatus may further comprise a plurality of members, each member pivotally connected to at least one adjacent member about at least one axis of rotation.

One or more components of the apparatus including one or more flywheels and/or gears and/or generators may be arranged and configured for the transfer of thermal energy generated by the components to a body of water when the apparatus is at least partially submerged in the body of water and in use.

Two flywheels of the plurality of flywheels may be coupled together, a first flywheel of the two flywheels may be associated with a clutch connected to the drive shaft and configured to engage the first flywheel only when the drive shaft exceeds a threshold rotational velocity, and a second flywheel of the two flywheels may be connectable to the drive shaft via a one way bearing which is configured, in use, to engage the second flywheel with the drive shaft and transfer rotational energy to the drive shaft from the two flywheels when the rotational energy of the two flywheels exceeds the rotational energy input to the drive shaft by the rotatable shafts and gear system so that the rotational velocity of the drive shaft can be substantially maintained.

According to a fourth aspect of the present invention, there is provided apparatus for extracting power from water waves comprising a first member pivotally connected to a second member about a first axis of rotation and configured for relative movement when the apparatus is subjected to kinetic energy of a water wave, the apparatus further comprising a first pair of gears arranged to rotate about the first axis of rotation, rotation of a first gear of the pair of gears permitted in a first direction and restricted in a second direction opposite the first direction, rotation of the second gear of the first pair of gears permitted in the second direction and restricted in the first direction opposite the second direction, the apparatus further comprising a rotatable shaft linked to the first pair of gears by a pinion such that, one of the gears of the first pair of gears engages with the pinion to drive the rotatable shaft in the same direction regardless of the direction of rotation of the first member relative to the second member about the first axis of rotation.

According to a fifth aspect of the present invention, there is provided a method of extracting power from water waves comprising the step of positioning an apparatus according to the first, third or fourth embodiments in relation to a body of water such that one or more water waves of the body of water act upon at least part of the apparatus to force relative movement between respective parts of the apparatus to drive the gears for the extraction of power from the water waves.

According to a sixth aspect of the present invention, there is provided a method of extracting power from water waves comprising the step of providing an apparatus comprising a universal joint according to the second aspect and positioning the apparatus in relation to a body of water such that one or more water waves of the body of water act upon at least part of the apparatus to force relative movement between respective parts of the apparatus to drive the gears of the universal joint for the extraction of power from the water waves.

DESCRIPTION OF THE DRAWINGS

In order that the invention may be more clearly understood, embodiments thereof will now be described, by way of example, with reference to the accompanying drawings in which.

DETAILED DESCRIPTION

Figure 1:
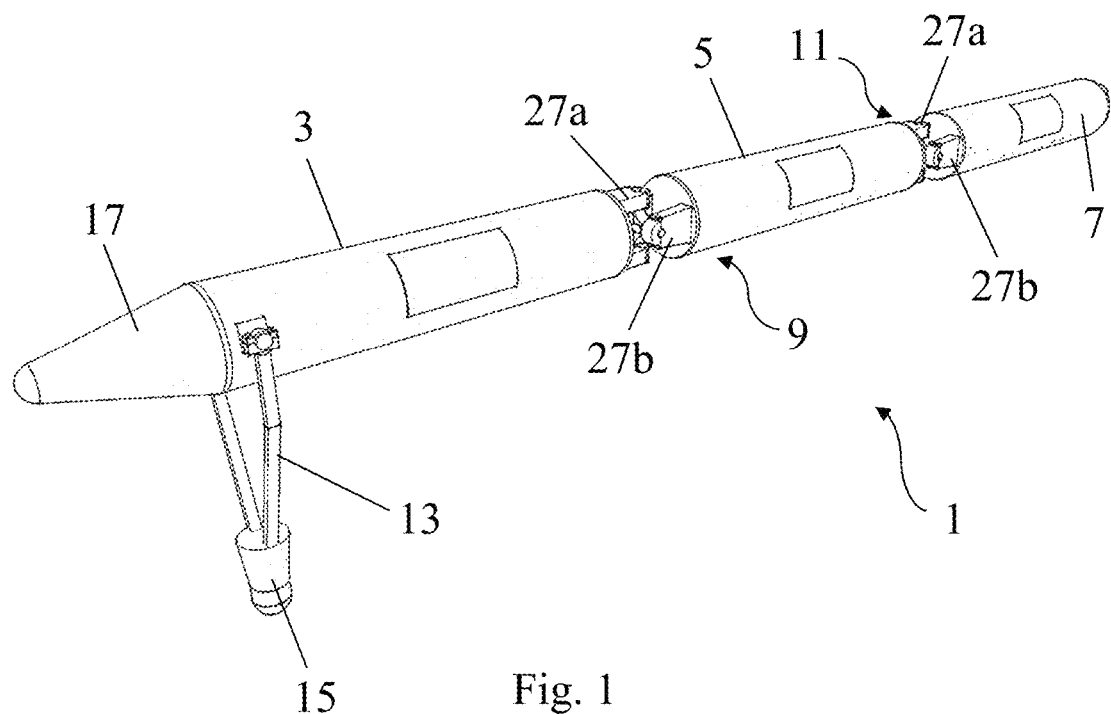
FIG. 1 shows a wave energy converter according to an example of the present disclosure.

Referring to FIG. 1, there is shown an offshore wave energy converter (WEC) 1 operable to float on the surface of the ocean or sea and to bend and flex to generate electricity when subjected to the kinetic energy of water waves. In the embodiment depicted, the WEC 1 comprises three buoyant members 3, 5, 7 connected in series. Whilst three interconnected members are shown in the present embodiment, it will be appreciated that more or less members may be interconnected as desired, provided there are at least two members that may pivot relative to one another. Each buoyant member 3, 5, 7 is pivotally connected to an adjacent member by a universal joint 9, 11 so as to permit 2-degrees of relative movement between adjacent connected members 3, 5, 7 so that the WEC 1 can generate electricity when acted upon by waves from all directions.

The WEC 1 further comprises a pivotally connected yoke 13 extending downwardly from a front-end member 3 of the wave energy converter 1 and terminating with a tether latch and mooring system 15 for anchoring the wave energy converter 1 to the sea or ocean floor. Although in one application it is desirable to fix the WEC 1 to the sea or ocean floor, it is envisaged that the WEC 1 may additionally or alternatively comprise one or more electrically driven propellers (not shown) to allow the WEC 1 to change location automatically using GPS for precision placement. This may be particularly useful for relocating the WEC 1 to areas with more wave activity for continued electricity generation or even for moving the WEC 1 out of areas of particularly inclement weather that that may have the potential to damage the WEC 1. The front-end member 3 terminates with a cone shaped end cap 17 for hydrodynamic purposes and to allow the WEC 1 to cut through the water more easily when in motion.

Figure 3:
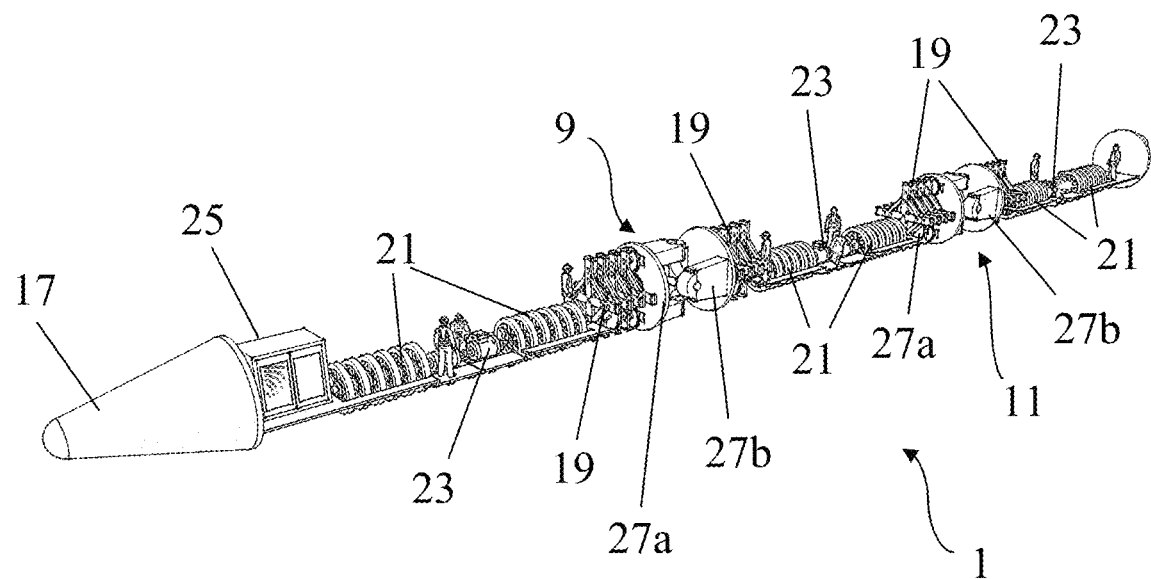
FIG. 3 shows the wave energy converter of FIG. 1 with outer segments removed to show internal components of the wave energy converter.

Each member 3, 5, 7 comprises a substantially cylindrical, hollow body made predominantly from steel and having a diameter of approximately 4 m and a length of approximately 60 m such that the entire WEC 1 is approximately 180 m in length. As shown in FIG. 3 with the outer shell removed, each member 3, 5, 7 houses at least one gear system 19, at least one set of flywheels 21, and at least one electric generator 23. The gear systems 19, flywheels 21 and electric generators 23 in each member 3, 5, 7 are interconnected and configured to translate rotational energy into electrical energy that may be transferred to an electricity grid (not shown) via a transformer 25 contained within the front-end member 3 directly behind the end cap 17. Since electricity transmission from the WEC 1 to the onshore grid requires high voltage electric cables along the seabed, the WEC 1 may additionally or alternatively be equipped with wireless electricity distribution technology for the wireless transmission of energy in the form of electromagnetic waves from the WEC 1 to a wireless receiver connected to the onshore grid.

Figure 4:
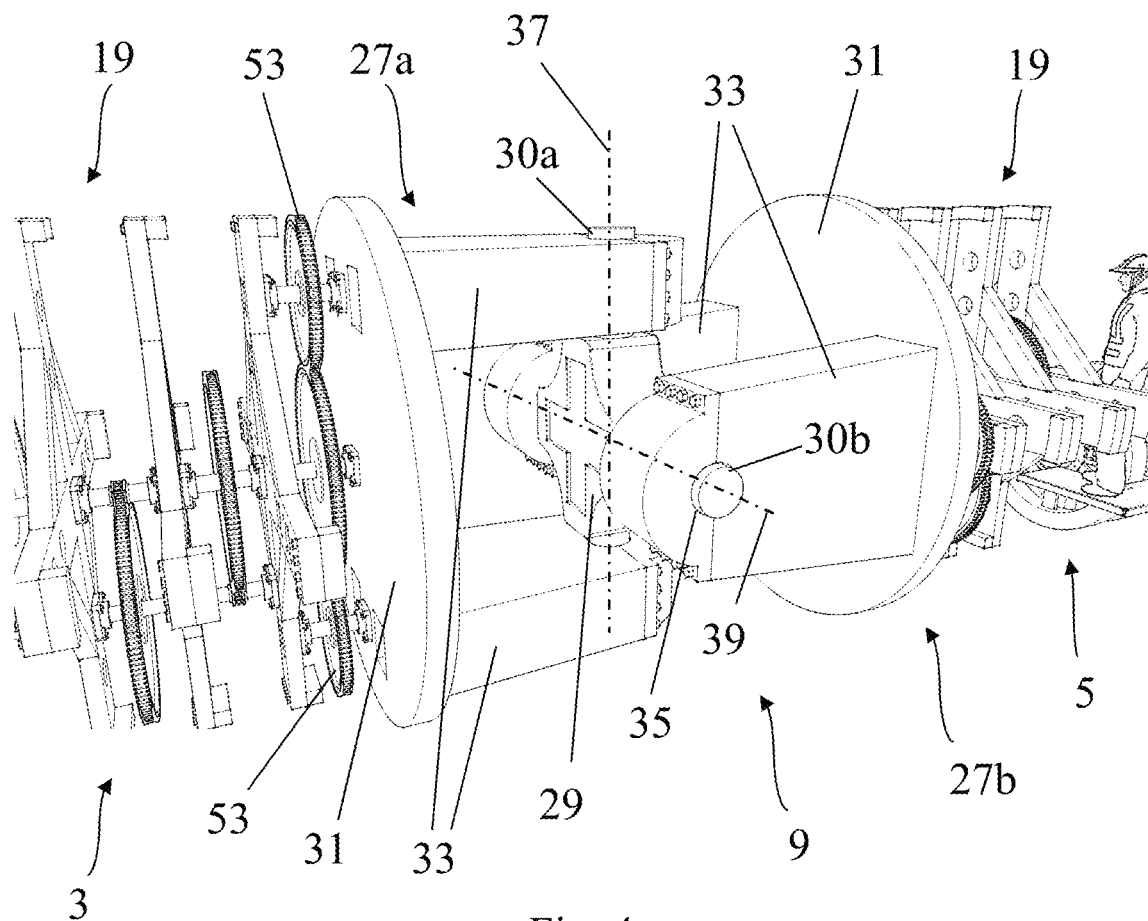
FIG. 4 shows a universal joint connection between two sections of the wave energy converter shown in FIG. 3.

Referring to FIG. 4, the rotational energy for generating electricity is translated from the kinetic energy of the waves upon relative movement between adjacent members 3, 5, 7 when subjected to one or more water waves. This relative movement is permitted by the universal joints 9, 11 which each comprise a pair of yokes 27a, 27b extending from the connected ends of adjacent members 3, 5 and which are each pivotally connected to an intermediate block or piece in the form of a cross 29 made from stainless steel and comprising a pair of substantially perpendicular cross-pins 30a, 30b. Each yoke 27a, 27b comprises a disc shaped flange 31 dimensioned to seal the end of the corresponding member 3, 5, and a pair of substantially parallel, hollow arms 33 extending from the flange 31 and each comprising an aperture 35 at one end for pivotal attachment to the cross-pins 30a, 30b of the cross 29. One yoke 27a of one member 3 is connected to a first cross-pin 30a such that the member 3 pivots about a first axis of rotation 37. The yoke 27b of the adjacent member 5 is connected to the other cross-pin 30b such that the corresponding member 5 pivots about a second axis of rotation 39 which is substantially perpendicular to the first axis 37. Accordingly, with this arrangement, when the WEC 1 is floating on the water surface, two adjacent members 3, 5 may pivot about a yaw axis which, in one orientation, may be the first axis of rotation 37, and may also pivot about a pitch axis which, in the same orientation, may be the second axis of rotation 39.

Figure 2:
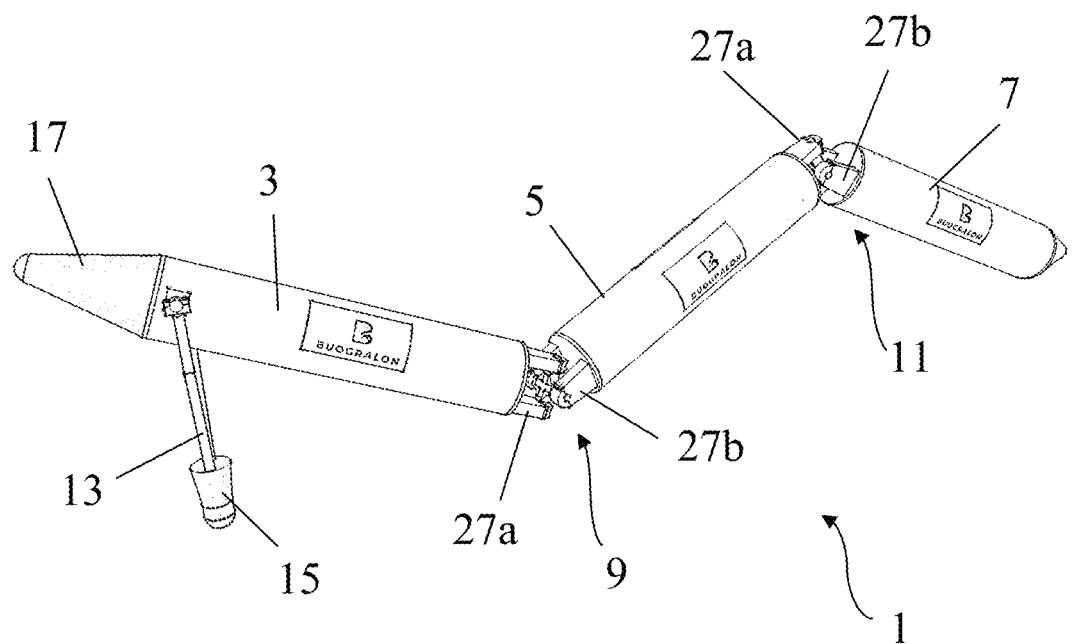
FIG. 2 shows the wave energy converter of FIG. 1 in a flexed state.

As shown in FIGS. 1-3, the front-end member 3 and the rear-end member 7 are each pivotally connected at one end to the central member 5. Therefore, each end member 3, 7 has a single yoke 27a, 27b extending therefrom to form one side of a universal joint 9, 11. Correspondingly, the central member 5 has a yoke 27a, 27b at each of its ends to form the other side of each universal joint 9, 11. In the embodiment depicted, a yoke 27a extending from one end of the central member 5 is substantially perpendicular to a yoke 27b extending from its other end. Accordingly, the interconnected components contained within the central member 5 and associated with one yoke 27a are configured to generate electricity upon relative rotation between adjacent members 3, 5 about the pitch axis 39, and the interconnected components contained within the member 5 and associated with the opposite end yoke 27b are configured to generate electricity upon relative rotation between adjacent members 5, 7 about the yaw axis 37.

Figure 5:
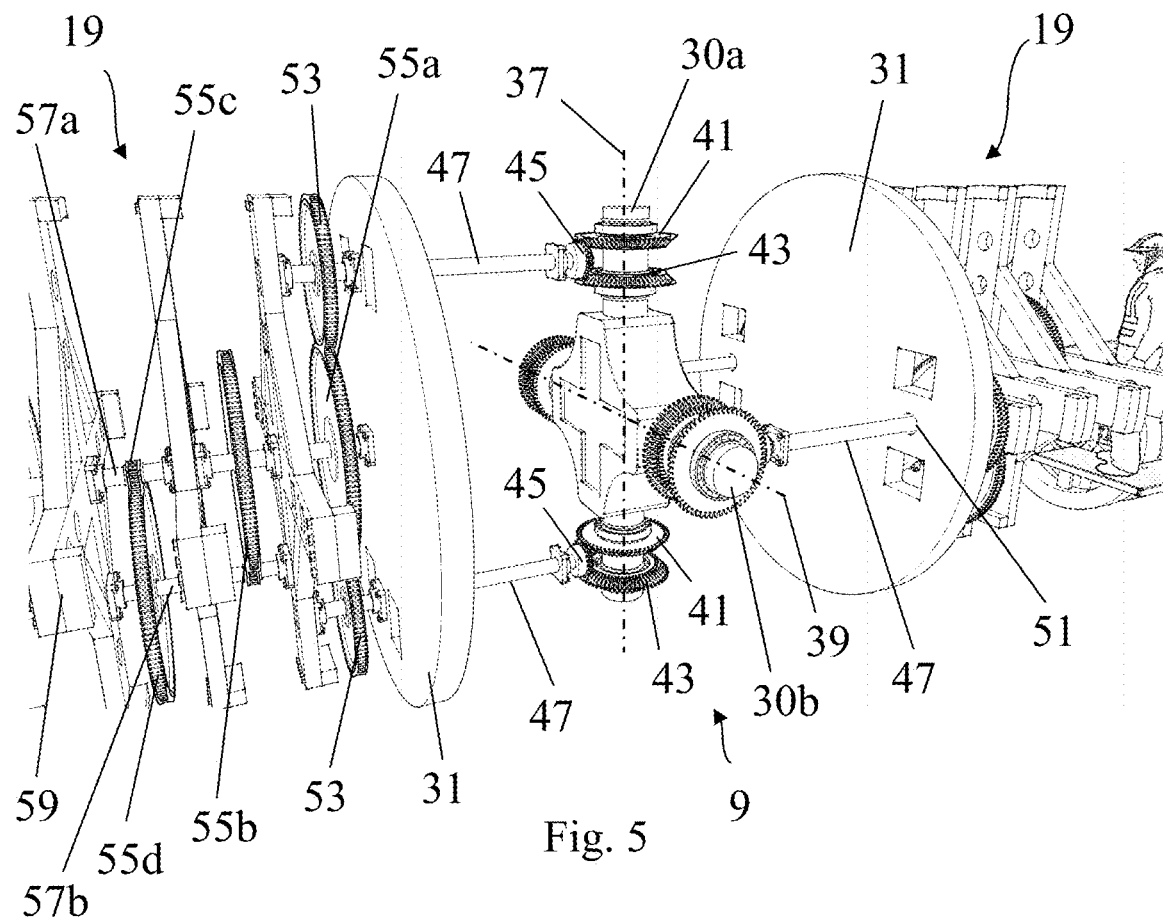
FIG. 5 shows the universal joint of FIG. 4 with parts removed to expose internal components of the joint.

With reference to FIG. 5 in which a yoke arm 33 has been removed to reveal internal components of a part of a universal joint 9, each yoke arm 33 houses a pair of bevel gears 41, 43 which are arranged on the associated cross-pin 30a, 30b so as to rotate about the corresponding axes of rotation 37, 39. The bevel gears 41, 43 of each pair of bevel gears are arranged such that the tooth-bearing sides face one another so that a single, frustoconically shaped pinion or drive gear 45 mounted on an input shaft 47 can be arranged to mesh with both bevel gears 41, 43. In this configuration, the input shaft 47 is spaced 90 degrees apart from the associated cross-pin 30*a*, 30*b* such that the input shaft 47 is substantially perpendicular to the corresponding axis of rotation 37, 39. Since the WEC 1 may be, on occasion, subjected to particularly rough seas with relatively high and rapid incident waves, each input shaft 47 is associated with a torque limiter clutch (not shown) operable to prevent damage to the direct mechanical drive power take-off during such inclement weather.

Figure 6:
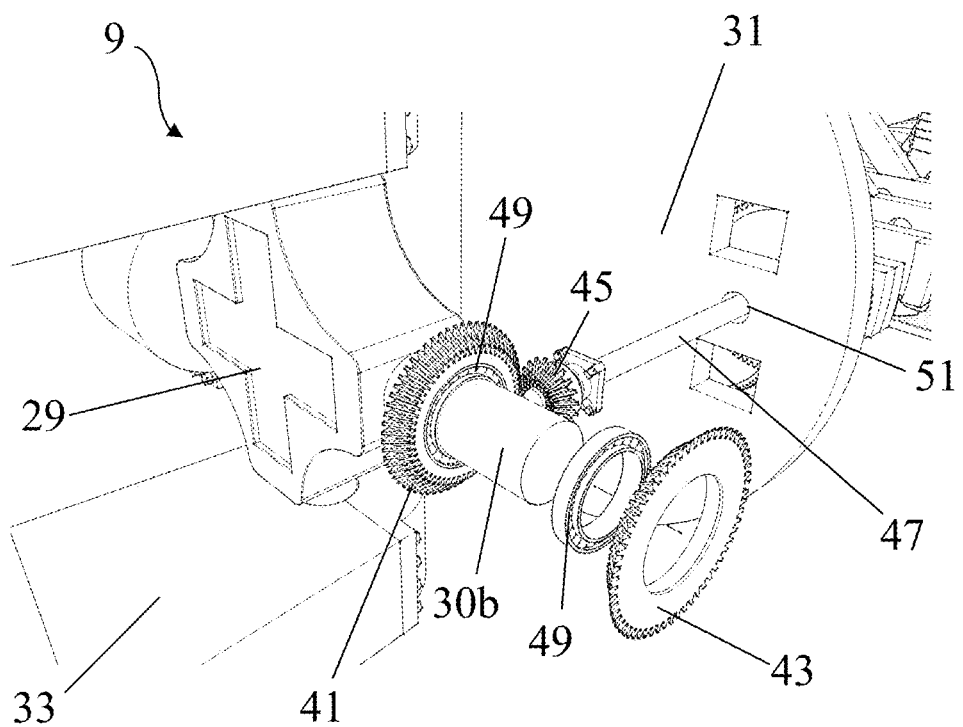
FIG. 6 shows a partially exploded view of the joint section shown in FIG. 5.
Figure 7:
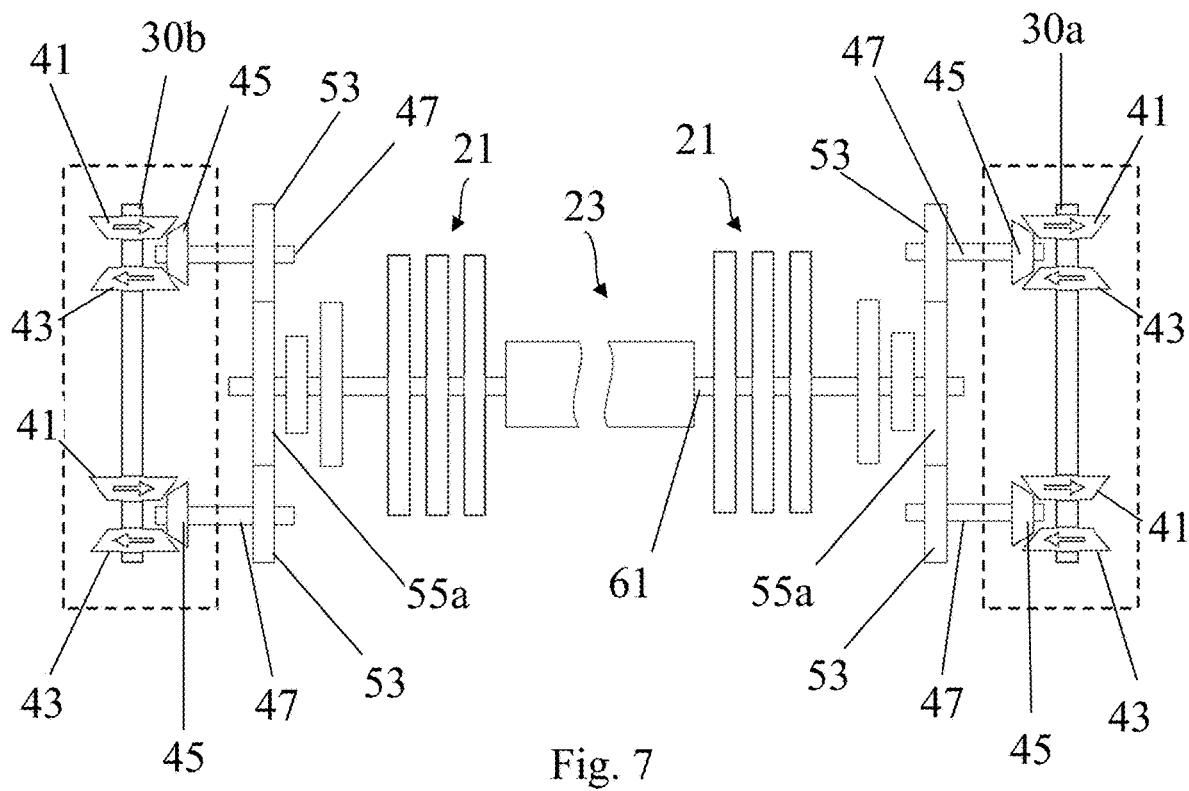
FIG. 7 shows a schematic representation of a cross section of the wave energy converter shown in FIG. 1 and the direction of rotation of a plurality of bevel gears at each end of the section, one end of the section being perpendicular to the other end but both ends being shown in plan view, one end arranged to rotate about the yaw axis and the other end arranged to rotate about the pitch axis.

As shown more clearly in FIG. 6, each bevel gear 41, 43 of each pair of bevel gears is associated with a one-way sprag clutch 49 which permits rotation of the associated bevel gear 41, 43 in a first direction of rotation and restricts rotation in the second direction opposite the first direction of rotation such that the bevel gear 41, 43 is fixed with respect to the associated cross-pin 30*a*, 30*b*. Referring to FIG. 7, for each pair of bevel gears, one bevel gear 41 and sprag clutch 49 combination is configured to freely rotate in a first direction and the other bevel gear 43 and sprag 49 clutch combination of the bevel gear pair is configured to freely rotate in a second direction opposite the first direction.

Since each yoke arm 33 houses a pair of bevel gears 41, 43, two pairs of bevel gears are arranged on a cross-pin 30*a*, 30*b* with each pair arranged on opposite sides respectively of the cross 29. A pinion 45 and input shaft 47 combination is connected to each pair of bevel gears 41, 43 and arranged to extend along the corresponding arm 33 of the yoke 27*a*, 27*b* and into the housing of the associated member 3, 5, 7 via an aperture 51 formed in the flange 31 of the yoke 27*a*, 27*b*. The end of each input shaft 47 opposite the pinion end is connected to an input gear 53 of the gear system 19 housed within the corresponding member 3, 5, 7 and configured to rotate with the input shaft 47. Whilst in the present embodiment, there are two pair of bevel gears arranged on a single cross-pin 30*a*, 30*b*, each connected to a corresponding pinion gear 45 and input shaft 47, it will be appreciated that a single pair of bevel gears and corresponding pinion gear and input shaft arrangement could instead be used to drive the gear system 19 or that more than two pairs of bevel gears and corresponding pinion gears and input shafts could be implemented.

Figure 8:
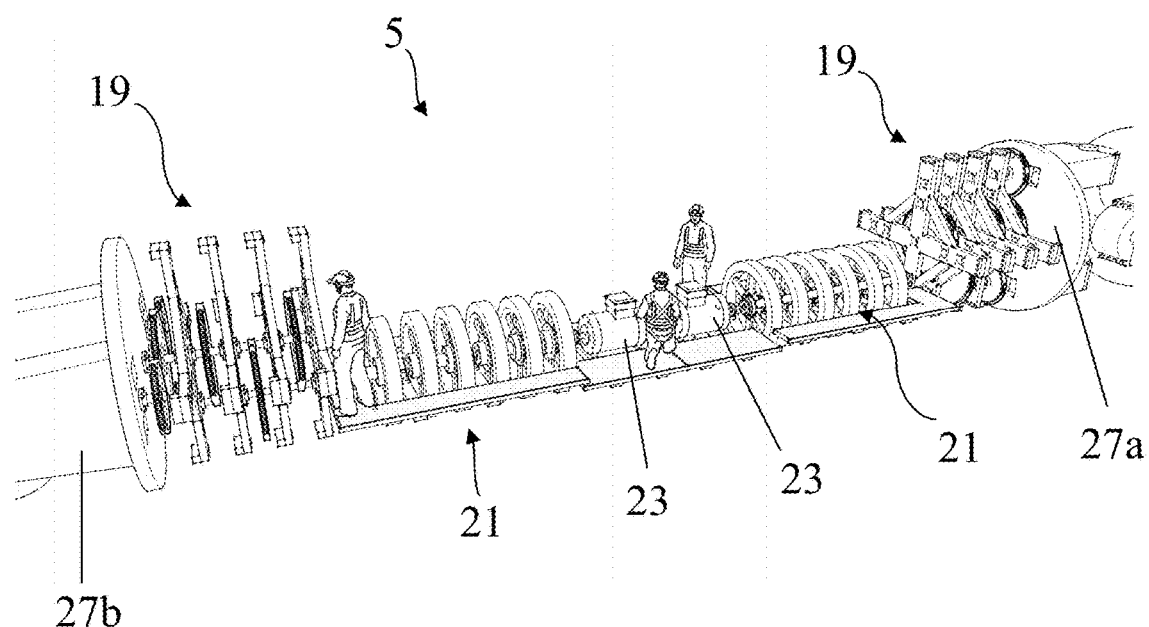
FIG. 8 shows the central part of a section of the wave energy converter shown in FIG. 3.
Figure 9:
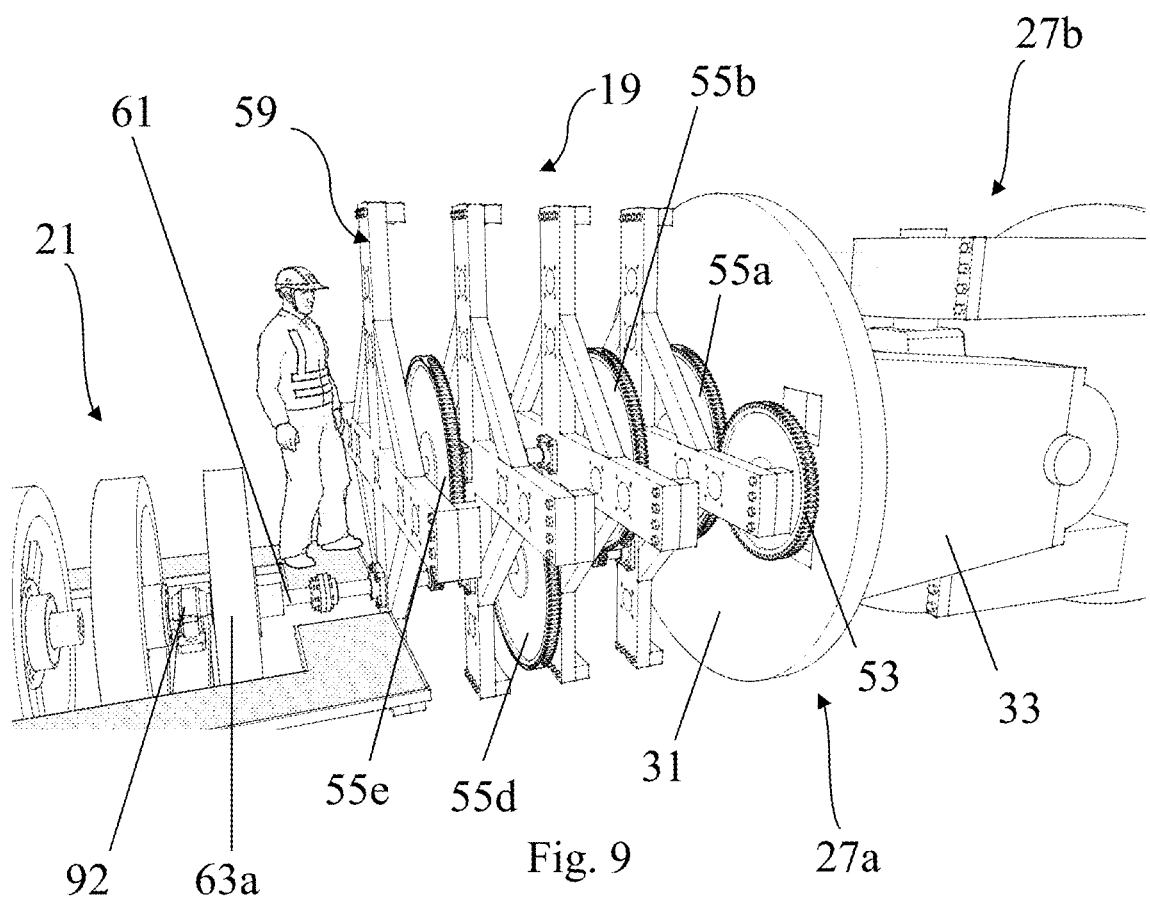
FIG. 9 shows an enlarged view of a gear train of the section of the wave energy converter shown in FIG. 8.

As shown in particular in FIGS. 5 and 8, each gear system 19 housed within each member 3, 5, 7 comprises a plurality of gears 55*a*, 55*b*, 55*c*, 55*d*, 55*e* arranged to rotate on corresponding shafts 57*a*, 57*b* and mounted to a frame 59 within the corresponding member 3, 5, 7. With this arrangement, the member housing itself is used to contain the gear system 19 instead of a bespoke gearbox casing. Advantageously, this allows for larger gears to be utilised according to the member 3, 5, 7 dimensions and, by eliminating the need for a gearbox, also reduces the cost of manufacture. In the embodiment depicted, the two input gears 53 connected to the bevel gears 41, 43 of one of the cross-pins 30*a* each mesh with a common gear 55*a* of the associated gear system 19 on either side of the common gear 55*a*. Accordingly, the rotation of both input shafts 47 is input to the same gear system 19 to rotate a drive shaft 61 that extends along the longitudinal axis of each member 3, 5, 7. The drive shaft 61 is connected to the further components along the chain, including the flywheels 21 and electric generators 23, so as to drive the further components upon rotation of the drive shaft 61.

Each electric generator 23 is of conventional type and connected to the gear system 19 and flywheels 21 by the drive shaft 61 which is operable to drive a coil to rotate within a magnetic field for the generation of electricity. The electric generators 23 of each member 3, 5, 7 are connected to the power transformer 25 at the front-end member 3 so that any generated electricity can be transferred to an electricity grid for utilisation. Each electric generator 23 requires a relatively fixed rotational velocity of approximately 1500 rpm to generate a stable supply of electricity. Accordingly, the gear system 19 is configured to increase the rotational velocity of the input gears 53, which is typically of the order 1 rpm, to output a rotational velocity of around 1,500 rpm. The set of flywheels 21 associated with a gear system 19 are arranged to store excess rotational energy and help ensure a stable rotational velocity of the drive shaft 61 for the generation of electricity even in the absence of sufficient wave activity incident upon the WEC 1.

Figure 10:
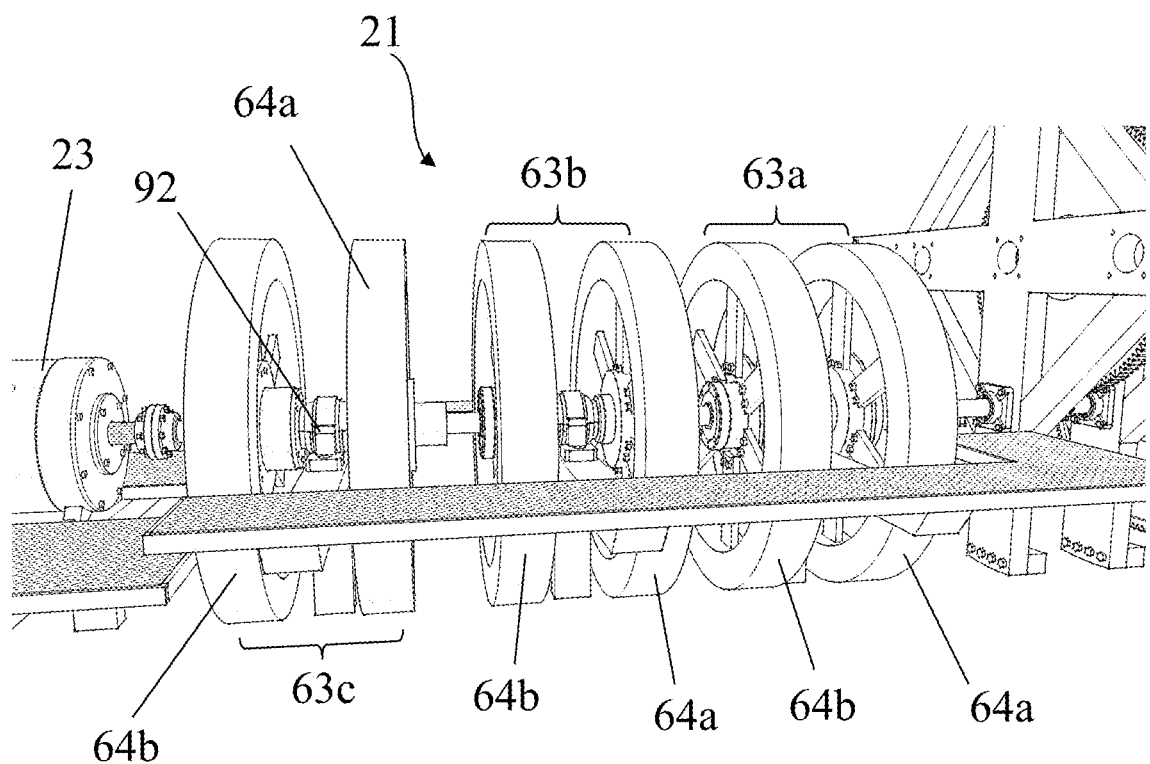
FIG. 10 shows an enlarged view of a series of coaxial flywheels arranged along the length of the section of the wave energy converter shown in FIG. 8.
Figure 11:
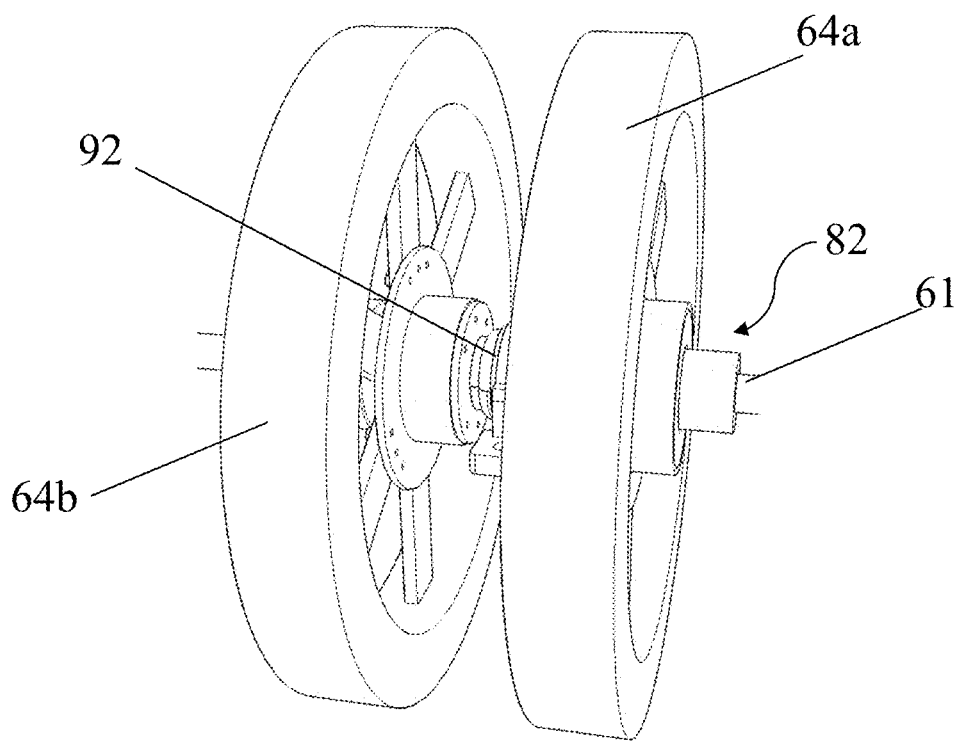
FIG. 11 shows a pair of linked flywheels shown in FIG. 10.

As shown in FIG. 10, each set of flywheels 21 comprises three pairs of connected flywheels 63*a*, 63*b*, 63*c* which are linked to the drive shaft 61 and configured to store rotational energy which is proportional to the square of its rotational velocity and mass. Whilst three pairs of flywheels 63*a*, 63*b*, 63*c* per gear system 19 are depicted, it will be appreciated that more or less pairs of flywheels may be implemented according to application requirements. Each flywheel pair 63*a*, 63*b*, 63*c* comprises a first flywheel 64*a* and a second flywheel 64*b*, coupled together and rotatable about the drive shaft 61 axis.

Figure 12:
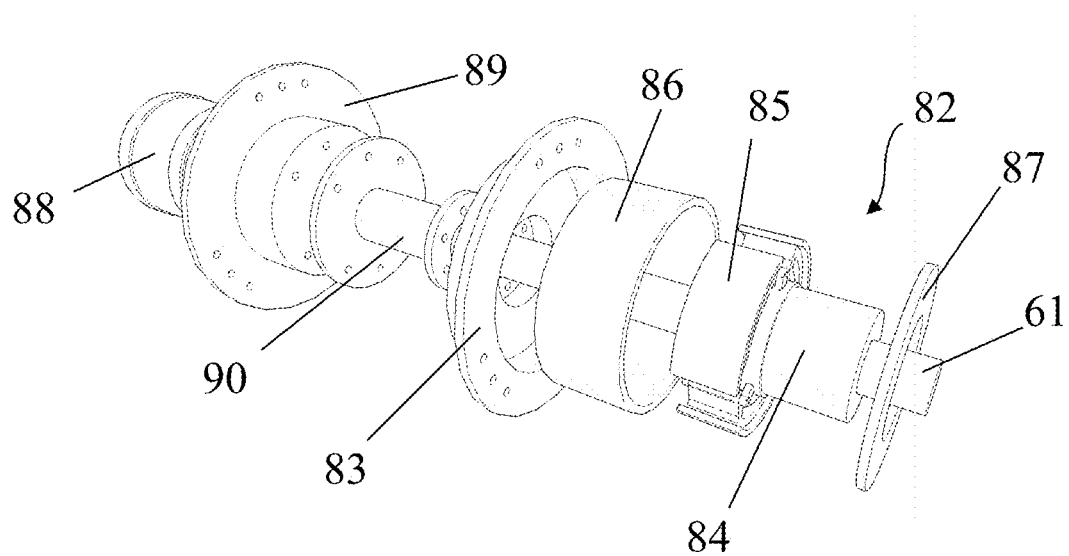
FIG. 12 shows an exploded view of component parts of a clutch system associated with each flywheel shown in FIG. 11.
Figure 13:
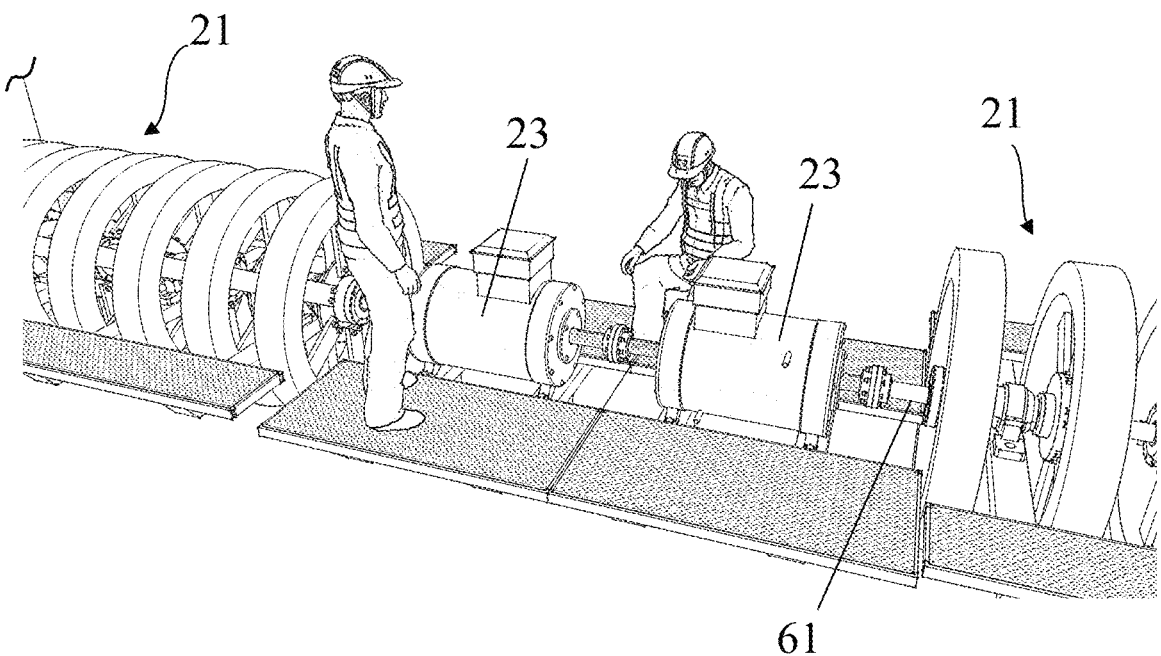
FIG. 13 shows an enlarged view of two electric generators of the section of the wave energy converter shown in FIG. 8.

The first flywheel 64*a* of each pair is associated with a centrifugal clutch 82 which is fixed to rotate with the drive shaft 61 and which is operable to link a first flywheel bracket 83 to the drive shaft 61 when the drive shaft 61 reaches a predetermined rotational velocity. As shown in FIG. 12, the centrifugal clutch 82 comprises an inner rotor 84 which houses centrifugal clutch components such as springs that are attached to a clutch member 85 that is operable to move in an outward direction and engage with an outer ring 86 when a threshold rotational velocity is exceeded. The clutch components are substantially housed within the outer ring 86 which is sealed by a disc shaped cover 87 to restrict the ingress of potentially damaging dust and water. The outer ring 86 is attached to the first flywheel bracket 83 so that, when the predetermined rotational velocity of the drive shaft 61 and, hence, the centrifugal clutch 82 is reached and exceeded, the centrifugal clutch 82 connects the drive shaft 61 to the first flywheel 64*a* and forces it to rotate with the drive shaft 61 for the storage of rotational energy.

The second flywheel 64*b* of each flywheel pair 63*a*, 63*b*, 63*c* is equipped with a one-way bearing 88 which is attached to a second flywheel bracket 89 so as to connect the second flywheel 64*b* to the drive shaft 61. The one-way bearing 88 associated with the second flywheel 64*b* is oriented such that the second flywheel 64*b* engages with the drive shaft 61 in the direction of rotation of the drive shaft 61 and freewheels in the opposite direction. Accordingly, if the rotational velocity of the drive shaft 61 exceeds that of the second flywheel 64*b*, there is no engagement between the drive shaft 61 and the second flywheel 64*b* via the one way bearing 88. The first flywheel 64*a* and the second flywheel 64*b* are connected together by an intermediate cylindrical bracket 90 that extends around the drive shaft 61 between the first 64*a* and second flywheels 64*b* and which is connected at each end to a flywheel bracket 83, 89. Accordingly, when the first flywheel 64*a* is urged to rotate through activation of the centrifugal clutch 82, the second flywheel 64*b* is likewise urged to rotate with the first flywheel 64*a* through the intermediate bracket 90 connection.

Each first flywheel 64a of each flywheel pair 63a, 63b, 63c is speed activated and is therefore configured to engage with the gear system 19 only when a minimum rotational velocity of the output gear 55e and, hence, the drive shaft 61 has been reached. This allows each first flywheel 64a to be configured to engage the drive shaft 61 at progressively higher rotational velocities ranging from 800 to 1,500 rpm. In the present embodiment, the first flywheel pair is configured to activate at 800 rpm, the second flywheel pair 63b is configured to activate at 1000 rpm and the third flywheel pair 63c is configured to activate at 1,500 rpm. This staggered activation of speed activated flywheel pairs 63a, 63b, 63c reduces the amount of stress on the drive shaft 61 due to inertia and, therefore, reduces the likelihood of damage and, ultimately, maintenance requirements. To further reduce possible damage to the drive shaft 61, a roller bearing 92 is arranged between the first flywheel 64a and second flywheel 64b of each flywheel pair 63a, 63b, 63c and configured to bear the weight of the centrifugal clutch 82, one way bearing 88 and the flywheels 64a, 64b.

As discussed, since the first flywheel 64a is coupled to the second flywheel 64b via the intermediate bracket 90, if the first flywheel 64a is urged by the drive shaft 61 to rotate, the second flywheel 64b is likewise urged to rotate with the first flywheel member together with the drive shaft 61. Accordingly, when the drive shaft 61 is driven by the input shafts 47 and corresponding gear systems 19 due to wave activity and the rotational velocity of the drive shaft 61 exceeds the threshold for activation of the centrifugal clutch, the first and second flywheel 64a, 64b are urged to rotate with the drive shaft 61, thereby storing rotational energy. If the wave activity drops such that the power input to the drive shaft 61 from the yokes 27a, 27b drops, the second flywheel 64b engages with the drive shaft 61 via the one way bearing 88 to transfer rotational energy from the flywheel pairs 63a, 63b, 63c back to the drive shaft 61 to maintain a stable rotational velocity of the drive shaft 61. As mentioned above, this allows for the generation of stable electricity by the electric generators 23 even in the absence of sufficient wave activity until such wave activity returns to input new power to the system via the yokes 27a, 27b.

The relatively high mass of a set of flywheels 21 and corresponding gear system 19 provides useful ballast to improve the stability of each member 3, 5, 7 and, hence, the WEC 1. Since the members 3, 5, 7 are buoyant and configured for partial submersion in water, the position of the sets of flywheels 21, gear systems 19, and generators 23 within the member housing allows for the transfer of thermal energy generated through operation of the internal moving components such as the flywheel pairs 63a, 63b, 63c, gear systems 19 and generators 23 to the surrounding sea or ocean. Advantageously, therefore, by locating the flywheel pairs 63a, 63b, 63c within the partially submerged members 3, 5, 7 of the WEC 1, a natural cooling mechanism can be achieved to prevent overheating and reduce the maintenance requirements of the WEC 1.

The efficient transfer of thermal energy from the internal moving components may be further increased by an intermediate cooling system (not shown) which may be arranged and configured in relation to the internal moving components to facilitate thermal energy transfer from those components to the outer surface of each member 3, 5, 7. For example, an intermediate cooling system may comprise a closed tubular circuit containing liquid coolant. The tubular circuit may be arranged in proximity to internal components that generate high amounts of thermal energy. For example, high speed gears of the gear system 19 may be mounted for rotation about a spindle via roller bearings which are lubricated by engine oil and which produce relatively large amounts of thermal energy. The tubular circuit may be arranged in proximity to the roller bearings and oil lubricant to allow thermal energy to be transferred from the roller bearings and oil lubricant to the liquid coolant within the tubular circuit. The liquid coolant may be urged to flow around the circuit by a pump which is driven by the drive shaft 61 and generators 23. The tubular circuit may be arranged to extend along the surface of the corresponding member to allow thermal energy to be dissipated from the liquid coolant to the body of water in which the WEC 1 is at least partially submerged. Accordingly, the intermediate cooling system may help to minimise relatively high thermal temperatures of the moving internal components and thereby extend the life of such internal components and minimise damage and maintenance costs.

A final flywheel in the chain (not shown) may be arranged between a flywheel set 21 and the electric generator 23 or contained within the electric generator 23. This final flywheel is directly coupled to the drive shaft 61 and is therefore in a constate state of activation so as to supply the necessary inertia to help prevent loss of drive shaft 61 speed and the possible stoppage of input shaft 47 rotation between incident waves.

For the proposed dimensions of 4 m diameter and 180 m length, it is estimated a WEC 1 according to the present invention implementing a direct mechanical drive power take-off could generate approximately 4 MW or roughly five times more than a WEC of corresponding dimensions but implementing a hydraulic based power take-off. A further advantage of implementing a direct mechanical drive power take-off comprising gears, shafts, and flywheels, is that the dimensions of the WEC 1 can be simply reduced or increased as desired by adjusting the size of the components used. For example, if it is desired to implement a WEC 1 in waters with smaller waves, the buoyant members 3, 5, 7 and internal components can be reduced in dimension so as to react to the smaller wave sizes more readily and still generate a useful amount of electricity that may be adequate for applications with smaller electricity requirements. This is in contrast to a hydraulic based system which inherently requires larger dimensions and, therefore, limits the WEC for use in waters with the relatively larger waves necessary to force the relative movement between members for electricity generation.

Figure 14:
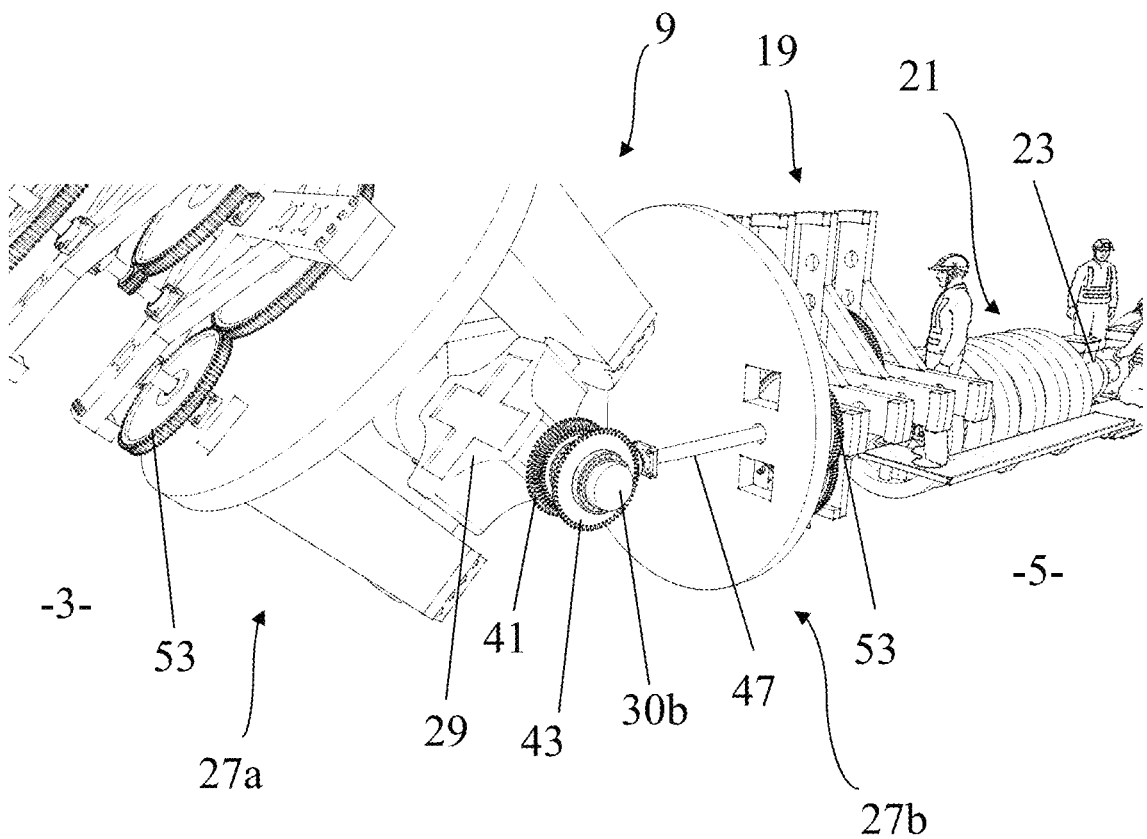
FIG. 14 shows the universal joint of FIG. 5 when one section is pitched upwards relative to an adjacent section about the joint.

Referring to FIGS. 14 to 19, when the WEC 1 is placed in the sea or ocean and subjected to sufficiently large waves to force relative movement between adjacent member 3, 5 the various bevel gear pairs 41, 43 and associated pinions 45 and input shafts 47 are forced to rotate so as to generate electricity. In FIG. 14, the front-end member 3 is pivoted upwardly relative to the central member 5 about the pitch axis 39 of cross-pin 30b. This movement is represented by the left-hand section of FIG. 16 which depicts the directions of rotation of the bevel gears 41, 43 mounted on the cross-pin 30b and, hence, the directions of rotation of all subsequent connected gears. As shown, with an upward pivotal rotation of one member 3 relative to an adjacent member 5 about the pitch axis 39, the cross-pin 30b rotates with the member 3 and, through engagement with the appropriately oriented sprag clutches 49, forces the connected first bevel gear 41 of each pair to rotate with the cross-pin 30b in a first direction. Meanwhile, rotation of the second bevel gear 43 of each pair is permitted such that the second bevel gear 43 can freewheel in a direction of rotation opposite the first direction. Accordingly, the pinion gear 45 and, hence, input shaft 47 are urged to rotate in a first direction without being hindered by the second, freewheeling bevel gear 43 of each pair. The input gears 53 attached to each input shaft 47 also rotate with the input shafts 47 in the first direction, thereby urging the first gear 55a and all subsequent gears 55b, 55c, 55d, 55c, 55f of the gear system 19 to rotate and output a higher rotational velocity to the drive shaft 61, set of flywheels 21 and, ultimately, the electric generator 23.

Figure 15:
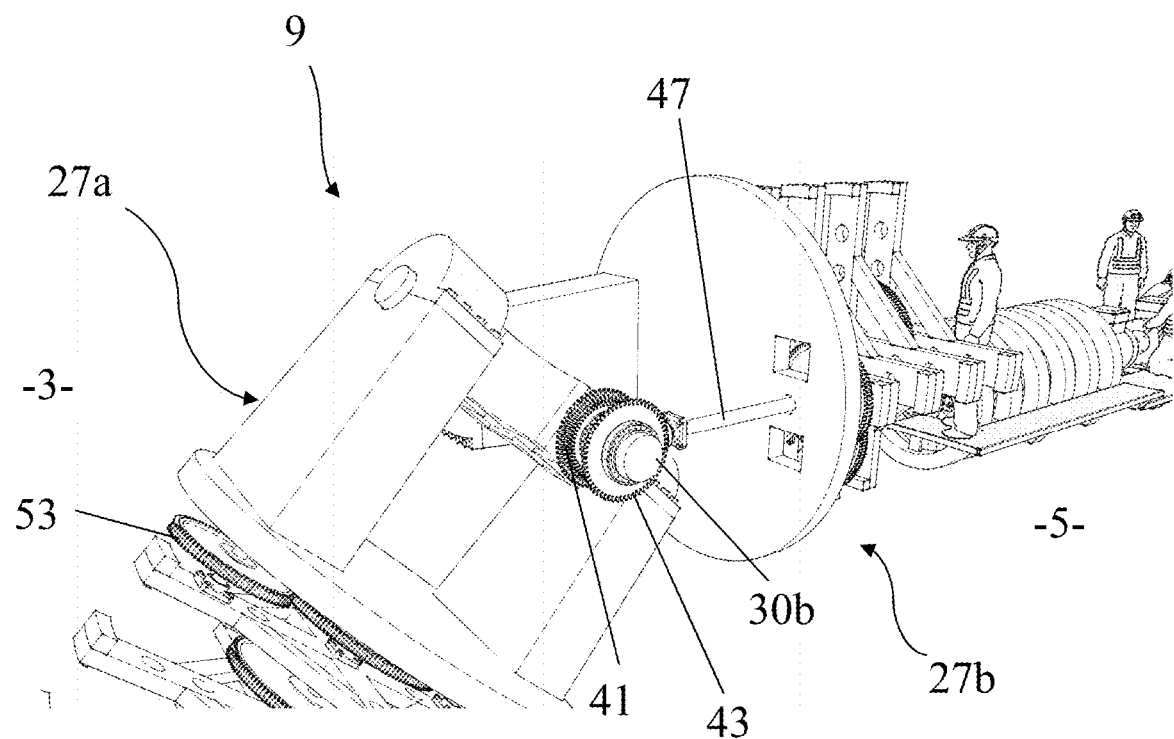
FIG. 15 shows the universal joint and adjacent sections of FIG. 14 when one section is pitched downwards relative to the adjacent section about the joint.
Figure 17:
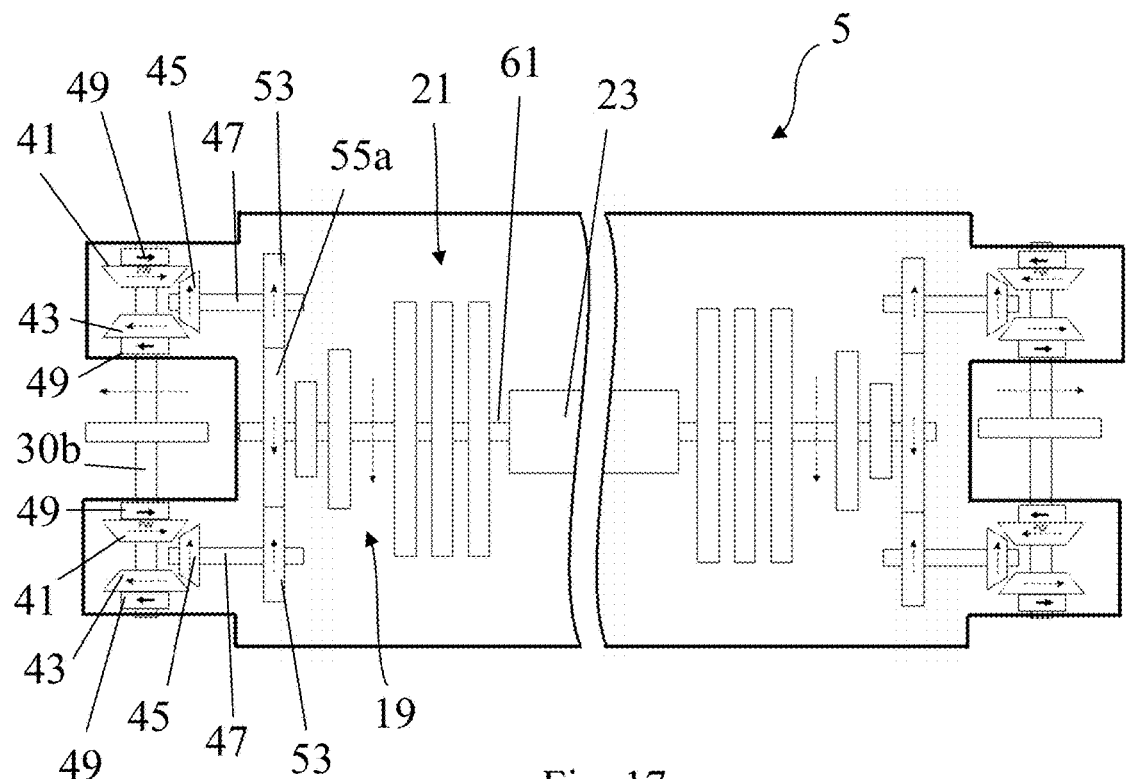
FIG. 17 shows the schematic representation of FIG. 16 and the direction of rotation of the gears, shafts and flywheels when one end rotates in a second direction about the pitch axis and the other end rotates in a second direction about the yaw axis.

Likewise, with reference to FIGS. 15 and 17, when the front-end member 3 pivots downwardly relative to the central member 5 about the same pitch axis 39, the cross-pin 30b rotates with the front-end member 3 in a second direction opposite the first and, through engagement with the appropriately oriented sprag clutch 49 of the second bevel gear 43 of each pair, forces the second bevel gears 43 to rotate with the cross-pin 30b in the second direction. Meanwhile the first bevel gear 41 of each pair is permitted to freewheel in the opposite direction so that the freewheeling first bevel gears 41 do not hinder the rotation of the pinion gear 45 and, hence, the corresponding input shaft 47.

Figure 16:
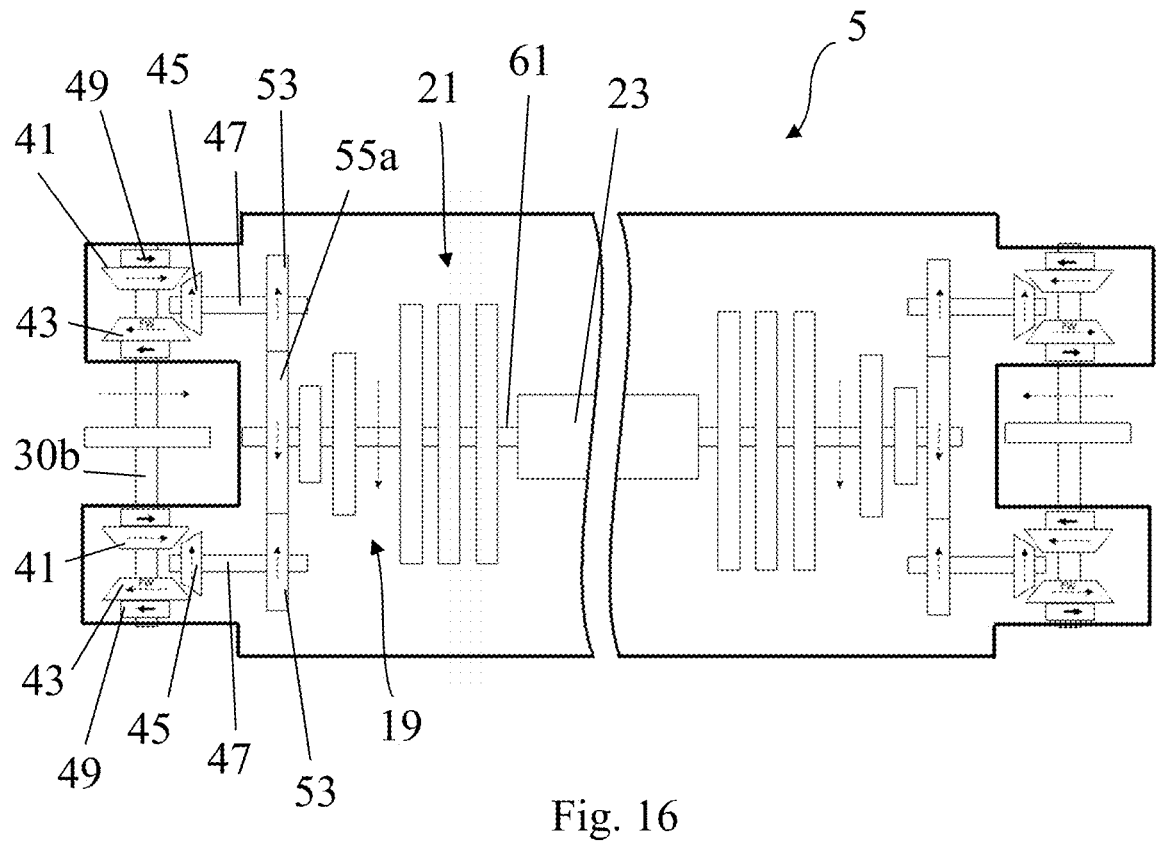
FIG. 16 shows a schematic representation of a cross section of the wave energy converter shown in FIG. 1, one end of the section being perpendicular to the other end but both ends being shown in plan view, one end arranged to rotate about the yaw axis and the other end arranged to rotate about the pitch axis, with the direction of rotation of gears, shafts and flywheels of the section depicted by arrows when one end rotates in a first direction about the pitch axis and the other end rotates in a first direction about the yaw axis.

As can be seen from FIGS. 16 and 17, since the second bevel gears 43 engage with the pinion 45 when the second bevel gears 43 are forced to rotate with the cross-pin 30b in the second direction, the pinions 45 and, hence, input shafts 47 are urged to rotate in the same direction as that urged by the first bevel gears 41 when the front-end member 3 is pivoted about the pitch axis in an upward direction. Accordingly, the pinions 45, input shafts 47 and input gears 53 associated with the cross-pin 30b are forced to rotate in the same direction regardless of the direction of rotation of the front-end member 3 relative to the central member 5 about the pitch axis 39. Consequently, the reciprocating motion of the members 3, 5 due to the action of external waves is translated into a constant rotation of the input shafts 45 and input gears 53 such that electricity may be generated from the kinetic energy of the waves regardless of the relative movement between the member 3, 5 about the pitch axis 39.

Figure 18:
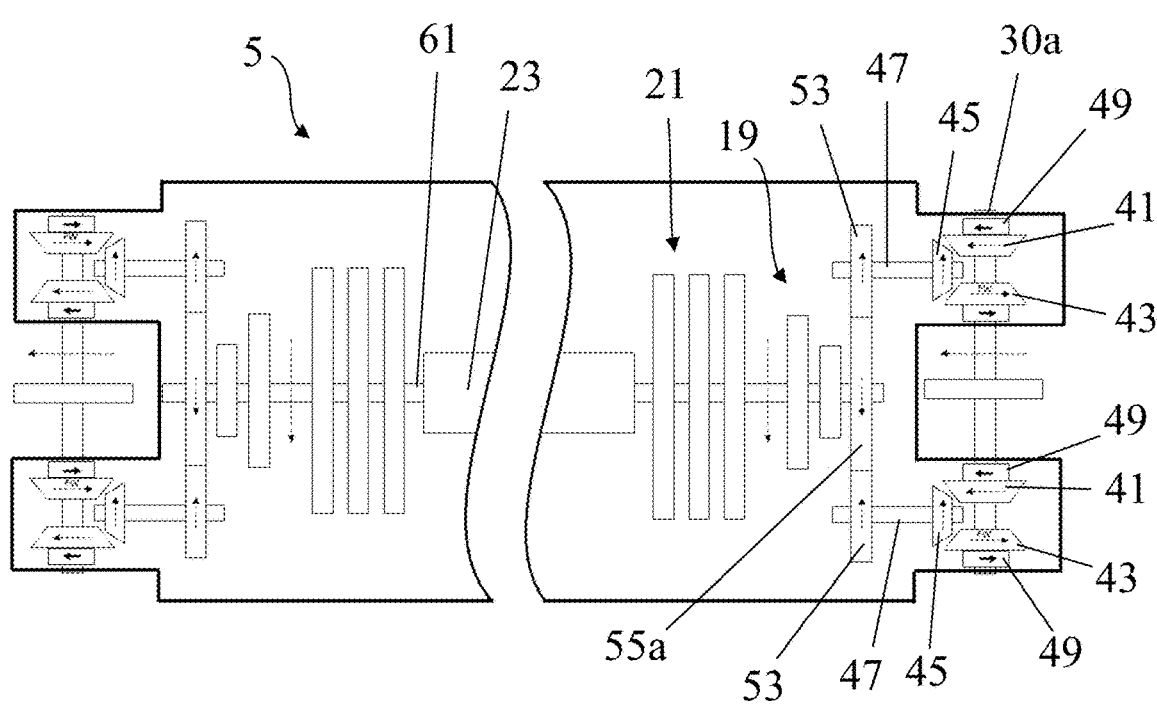
FIG. 18 shows the schematic representation of FIG. 16 and the direction of rotation of the gears, shafts and flywheels when one end rotates in a second direction about the pitch axis and the other end rotates in a first direction about the yaw axis.
Figure 19:
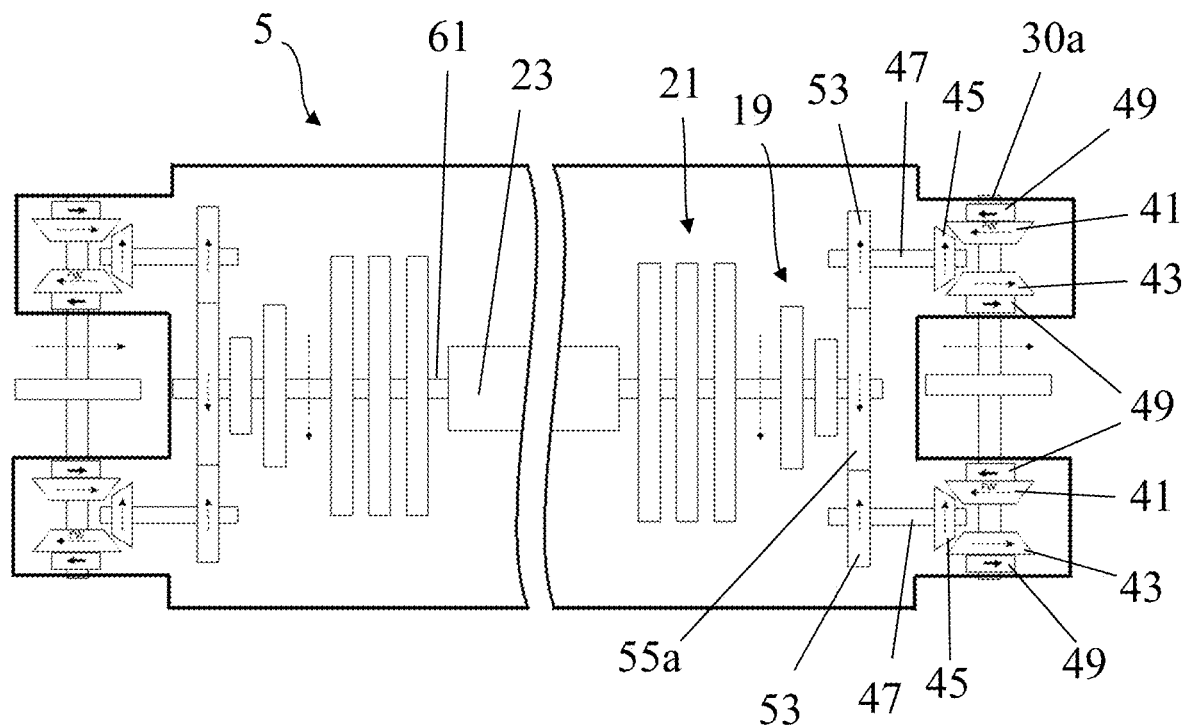
FIG. 19 shows the schematic representation of FIG. 16 and the direction of rotation of the gears, shafts and flywheels when one end rotates in a first direction about the yaw axis and the other end rotates in a second direction about the pitch axis.

Correspondingly, with reference to FIGS. 18 and 19, for example, a similar bevel gear and sprag clutch configuration achieves a continuous rotation of the input shafts 47 in one direction regardless of the relative direction of rotation of adjacent members 3, 5, 7 about the yaw axis 30a. As shown in FIG. 16, in the event the central member 5 rotates relative to an adjacent member 3, 7 in a first direction about the yaw axis 37, the rotating cross-pin 30a forces the sprag clutch 49 associated with the first bevel gear 41 of each pair to engage the first bevel gear 41 and force it to rotate with the cross-pin 30a in the first direction. The rotation of each first bevel gear 41 with the cross-pin 30a forces the pinion gears 45 and input shafts 47 to rotate in a first direction, thereby causing the gear system 19 to rotate and store rotational energy in the flywheels 21 and generate electricity via the electric generators 23. Since the second bevel gear 43 of each pair is allowed to free wheel in the second direction opposite the first direction of rotation of the cross-pin 30a, the second bevel gears 43 do not interfere with rotation of the pinions 45 and input shafts 47.

When the central member 5 rotates relative to an adjacent member 3, 7 in a second direction about the yaw axis 37 opposite the first direction, the sprag clutches 49 associated with the second bevel gears 43 are engaged by the cross-pin 30a which forces the second bevel gears 43 to rotate in the second direction with the cross-pin 30a. Rotation of the second bevel gears 43 in the second direction forces the pinion gears 45 and input shafts 47 to again rotate in a first direction without being hindered by the now freewheeling first bevel gears 41. Accordingly, the pinions 45 and input shafts 47 associated with cross-pin 30a are urged to rotate in the same direction regardless of the direction of rotation of one member 5 relative to an adjacent member 3, 7 about the yaw axis 37. As indicated in FIGS. 16 to 19, the bevel gears 41, 43 and sprag clutches 45 associated with both the yaw axis cross-pin 30a and pitch axis cross-pin 30b are all configured to force the pinions 45 and input shafts 47 to rotate in the same direction regardless of the direction of rotation of the buoyant members 3, 5, 7 about their respective axes. Accordingly, electricity may be continuously generated by the electric generators 23 within each member 3, 5, 7 when the WEC 1 is acted upon by waves from all directions.

Figure 20:
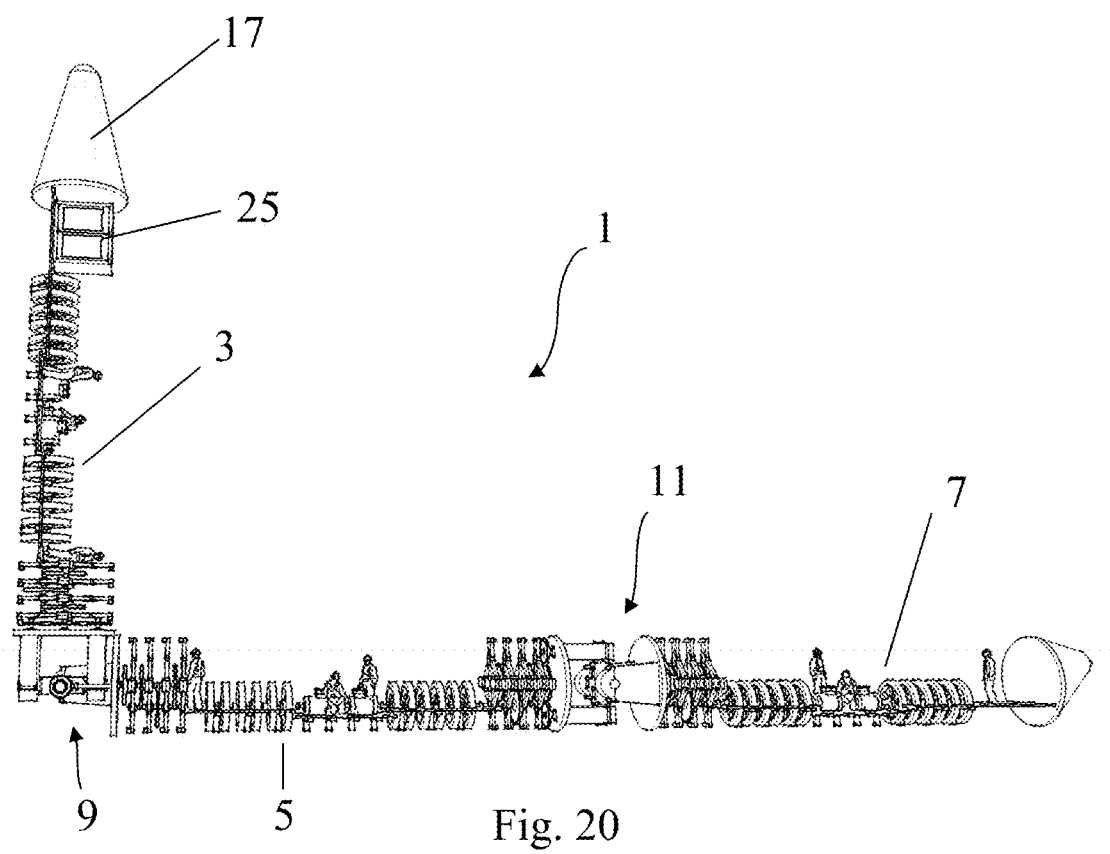
FIG. 20 shows the wave energy converter of FIG. 3 when one section is arranged perpendicular to an adjacent section about the universal joint.
Figure 21:
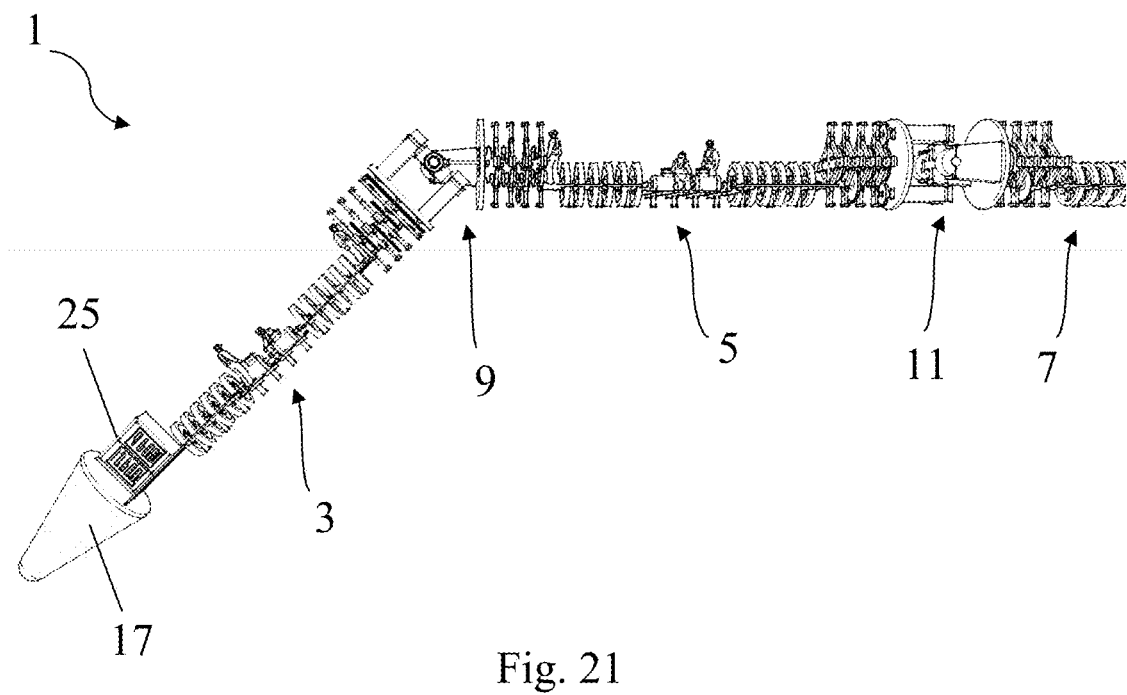
FIG. 21 shows the wave energy converter of FIG. 3 when one section is pitched downwards relative to an adjacent section.
Figure 22:
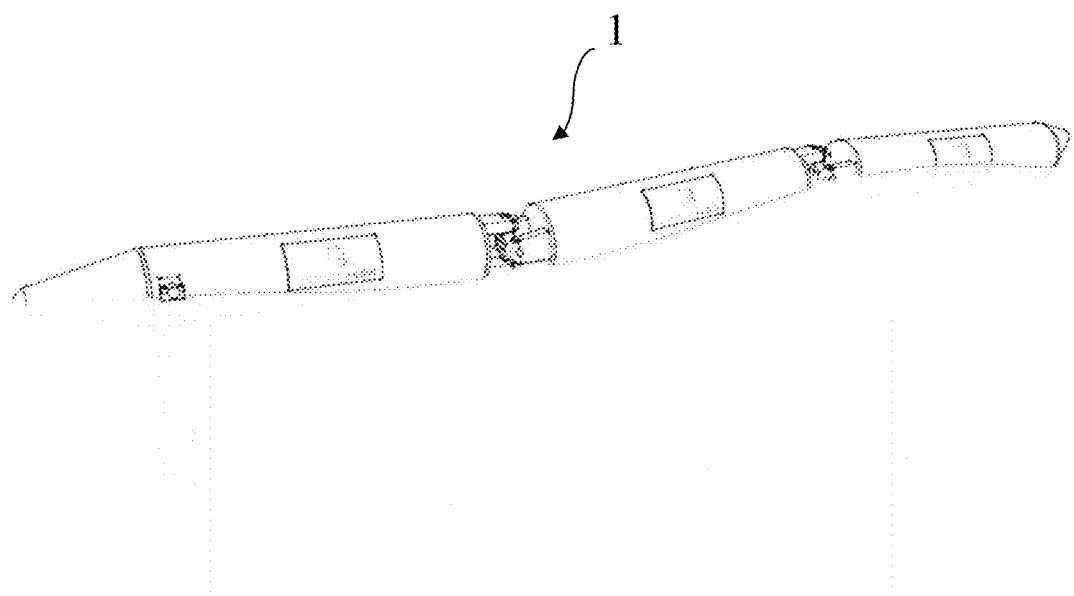
FIG. 22 shows the wave energy converter shown in FIG. 1 when floating on the sea or ocean surface.
Figure 23:
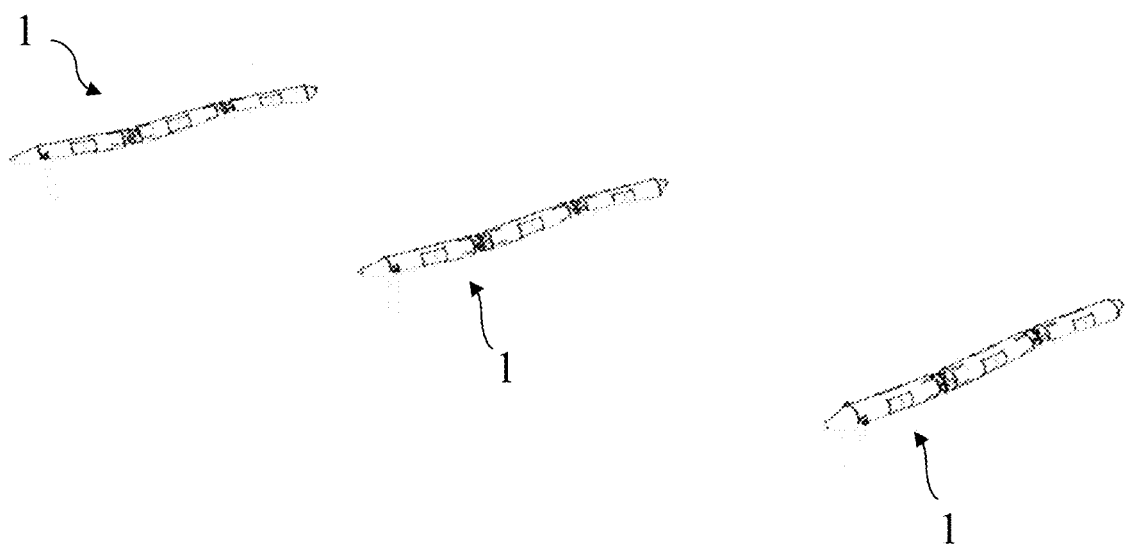
FIG. 23 shows a network of three of the wave energy converters shown in FIG. 1 when floating on the sea or ocean surface.

Referring to FIGS. 22 and 23, one or more WEC 1 may be arranged on the surface of the sea or ocean. The, or each, WEC 1 oscillates with the sea or ocean waves through pivoting of the members 3, 5, 7 about the respective universal joints 9, 11 to convert the kinetic energy of the waves into rotational energy for generation of electricity. Using a network of offshore WECs, it is possible to generate abundant, clean energy for the needs of society without adding greenhouse gases into the atmosphere and contributing to climate change. Furthermore, as shown in FIG. 20, by combining a mechanical drive power take-off with a universal joint, a WEC 1 according to the present embodiment is capable of flexing 90 degrees between adjacent members 3, 5, 7 and this allows the WEC 1 to resonate with much larger waves than a conventional WEC and, thereby, allow the WEC 1 to operate in rougher seas and generate electricity with greater efficiency and with less susceptibility to damage.

Whilst the members 3, 5, 7 of the present WEC 1 are substantially cylindrical in shape, it will be appreciated that other body shapes for a member may be used according to application and budget requirements. For example, a member body could be shaped in a similar way to a ship's hull in which the member body is hydrodynamically designed to stay afloat and prevent cutting through steep waves. For example, a member body could comprise a flat bottom, vee bottom, or round bottom shape.

Figure 24:
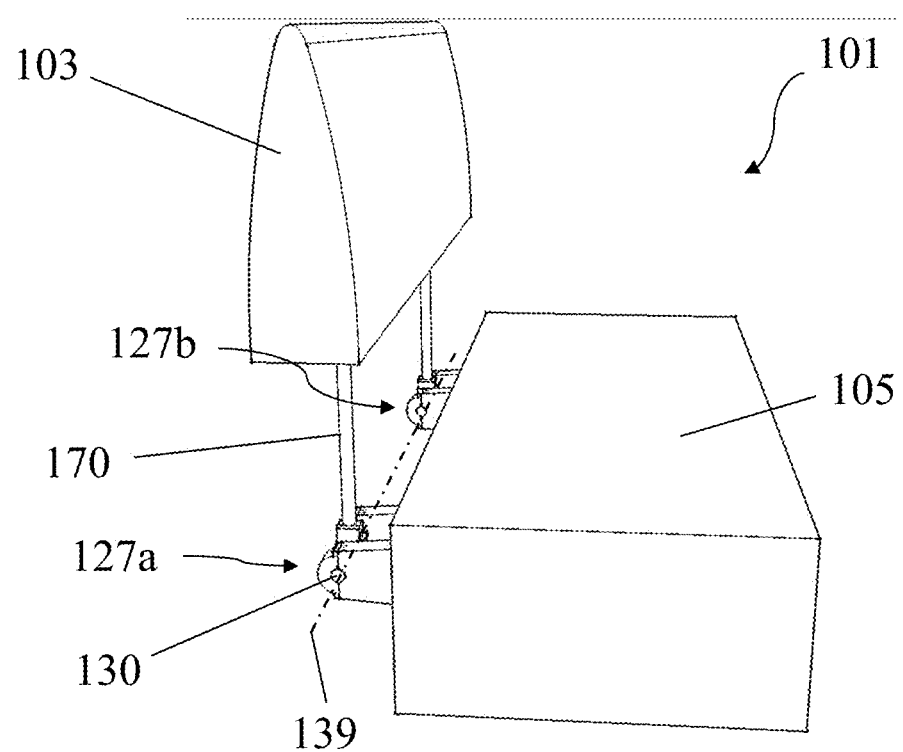
FIG. 24 shows an alternative wave energy converter according to an example of the present disclosure.
Figure 25:
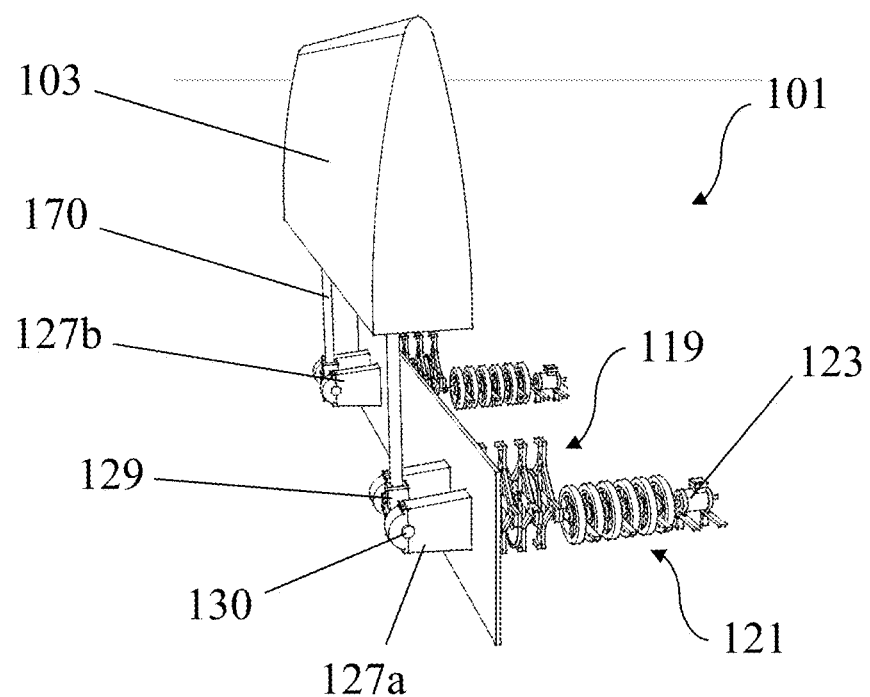
FIG. 25 shows the wave energy converter of FIG. 24 with an external section removed to show internal parts.

With reference to FIGS. 24 to 28, a WEC according to the present invention need not necessarily take the form of an oscillating 'snake' floating on the sea or ocean surface. As shown in FIGS. 24 and 25, an alternative WEC 101 may comprise a first member 103 in the form of a hydrofoil shaped flap which is pivotally connected to a substantially cuboidal shaped second member 105 which may be anchored in place. With this configuration, only the first member 103 is arranged to be acted upon by the sea or ocean waves so as to pivot relative to the second member 105. In this embodiment, the second member 105 houses the gear systems 119, flywheels 121 and generators 123 that are configured to generate electricity in response to pivotal movement of the first member 103 relative to the second member 105.

Two yokes 127a, 127b extend from one side face of the second member 105 and each yoke 127a, 127b constrains a cross-pin 130 of a corresponding cross 129 for pivotal movement about a common pitch axis 139. Two pairs of interfacing bevel gears are arranged about the cross-pin 130 within each yoke 127a, 127b. Each pair of bevel gears meshes with a drive gear in the form of a pinion which is attached to an input shaft that extends into the second member and is connected to a corresponding gear system 119 by an input gear which rotates with the input shaft. As with the first embodiment, the bevel gear pairs are associated with sprag clutches and configured such that one bevel gear of each pair may freely rotate in a first direction and is constrained in a second direction opposite the first. Correspondingly, the other bevel gear of each pair may freely rotate in the second direction but is constrained in the first direction opposite the second. Accordingly, regardless of the direction of rotation of the cross-pin 130 about the pitch axis 139, one bevel gear pair of each pair of bevel gears is configured to force the corresponding pinion and input shaft to rotate in the same direction whilst the other bevel gear of each pair freewheels so as not to hinder rotation of the pinion and input shaft.

The first member 103 pivots relative to the second member 105 due to the first member 103 being fixed to the cross 129 of each yoke 127a, 127b by a rod 170 which is fixed at either end to the cross 129 and first member 103, respectively. Rotation of the cross-pin 130 about the pitch axis 139 is caused by clockwise or counter-clockwise movement of the first member 103 relative to the second member 105 due to the action of the waves on the first member 103. As described above, this reciprocating motion urges the pinion and input shaft of each yoke 127a, 127b to rotate in the same direction regardless of the direction of rotation of the cross-pin 130. This rotation is input into the corresponding gear system 119 associated with each input shaft to activate the flywheels 121 in series depending on the rotational velocity of the drive shaft and subsequently to drive the electric generators 123 for the generation of stable electricity even in the absence of continued wave activity.

Figure 26:
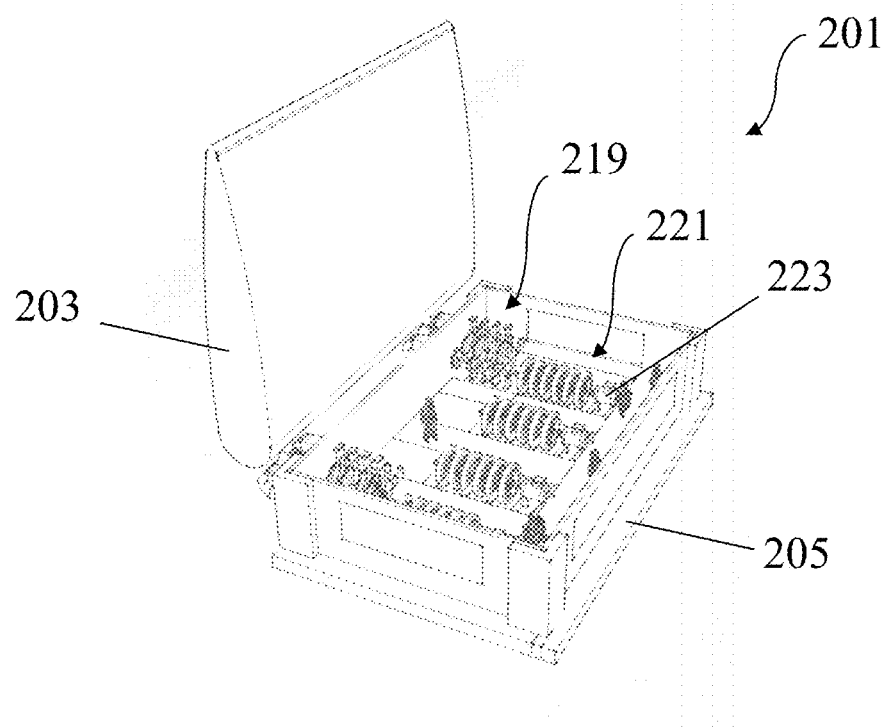
FIG. 26 shows an alternative wave energy converter according to an example of the present disclosure with parts removed to show internal components.
Figure 27:
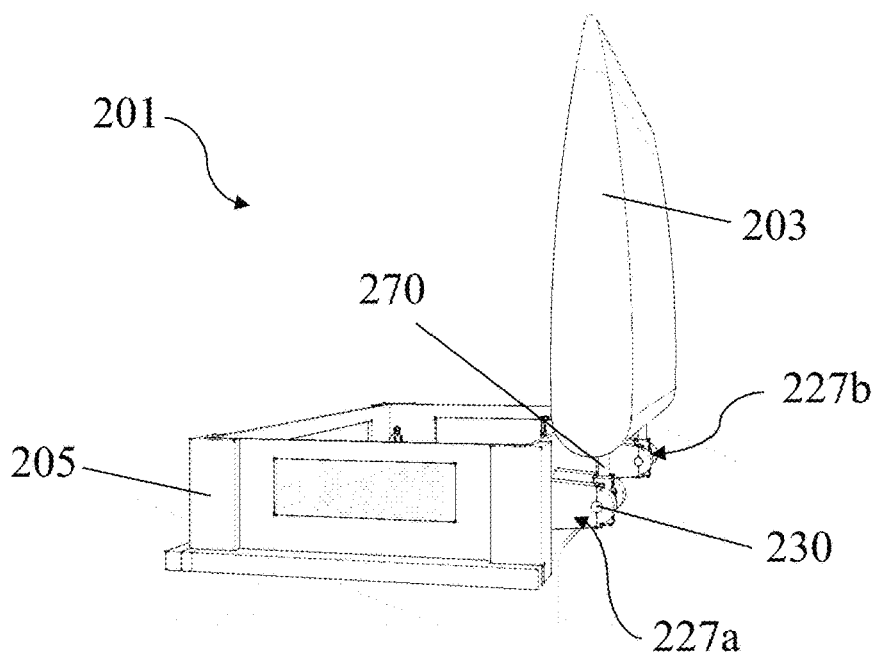
FIG. 27 shows the wave energy converter of FIG. 26 from a different perspective.

Referring to FIGS. 26 and 27, a similar but alternative embodiment of a WEC 201 is depicted, except that the rod 270 linking the first member 203 to the second member 205 is shorter than the rod 170 of the above-described alternative embodiment. By implementing a rod 270 of shorter length, the WEC 201 is more sensitive to smaller waves and is therefore more suited to generating electricity in calmer waters than the embodiment shown in FIGS. 24 and 25. Furthermore, the embodiment shown in FIGS. 26 and 27 comprises two additional sets of flywheels 221 for storage of excess energy so that a relatively constant rotation of the drive shafts can be maintained for the stable generation of electricity even in the absence of wave activity for a period of time.

Figure 28:
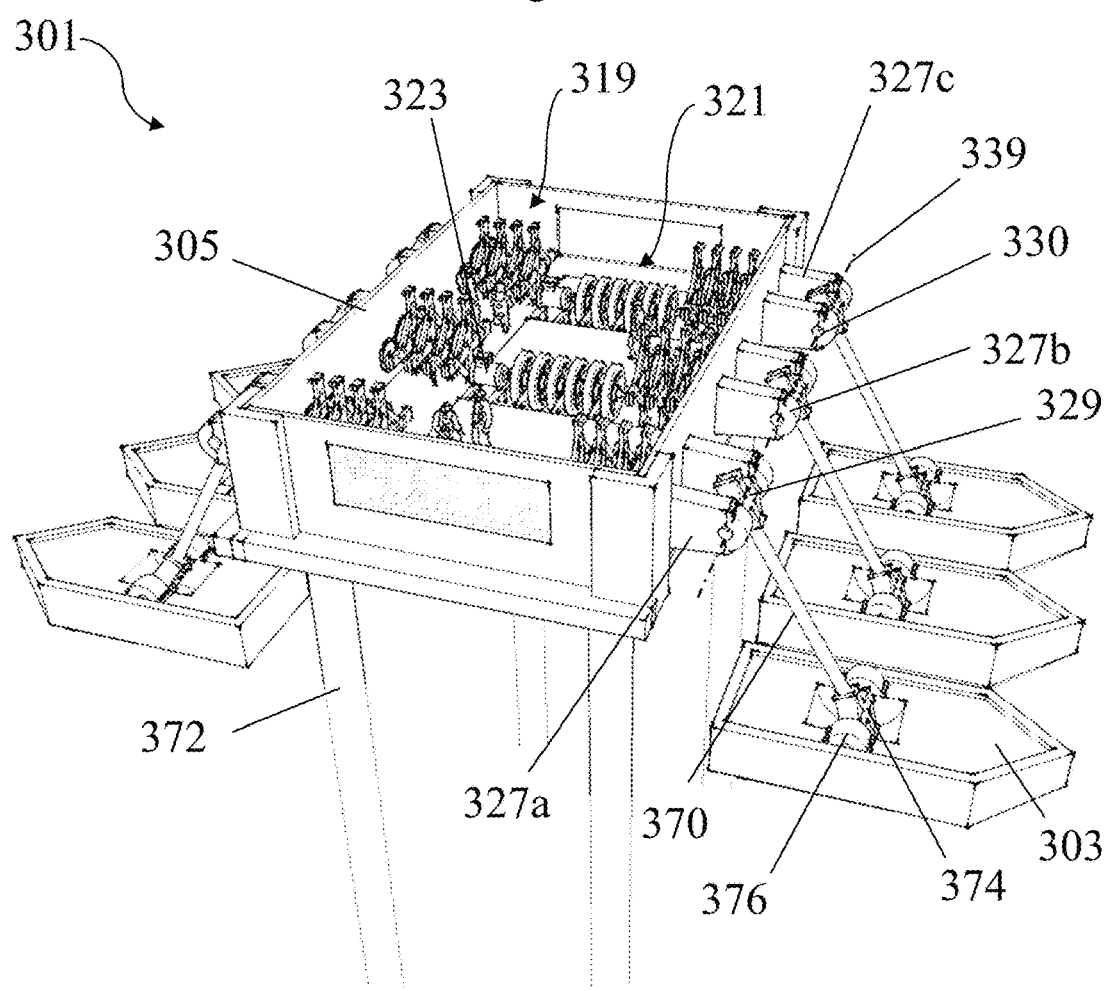
FIG. 28 shows an alternative wave energy converter according to an example of the present disclosure.

With reference to FIG. 28, a further alternative WEC 301 is shown which comprises a single, central member 305 and six buoyant members 303 pivotally attached to the central member 305. The central member 305 is anchored to the sea or ocean bed by a plurality of stilts 372 so that it is fixed in position and may support the buoyant members 303 for pivotal movement when subjected to one or more waves. The central member 305 is substantially cuboidal in shape and houses six gear systems 319 and three sets of flywheels 321 and corresponding electric generators 323. Each set of flywheels 321 is connected by a drive shaft to two gear systems 319 at opposite ends respectively of the set of flywheels 321. Each gear system 319 is connected to a pair of input shafts (not shown) which each extend out from the central member 305 body within the arms of a corresponding yoke 327a, 327b, 327c.

Each input shaft is linked to a pair of bevel gears which are arranged on the corresponding cross-pin 330 to rotate about the pitch axis 339. As with each other described embodiment, each bevel gear is associated with a sprag clutch which is operable to restrict movement of the bevel gear in a first direction and permit rotation of the bevel gear in a second direction. One bevel gear and sprag clutch combination of each pair is configured to freely rotate in a first direction and to engage with the cross-pin 330 and become fixed with respect to the cross-pin in the second direction opposite the first. Likewise, the other bevel gear and sprag clutch combination of each pair is oriented to freely rotate in the second direction and to engage the cross-pin 330 in the second direction so as to rotate with the cross-pin 330. As with each of the above-described embodiments, this configuration of bevel gears ensures that both the upward and downward motion of the buoyant members 303 relative to the central member 305 about the pitch axis 339 is translated into a continuous unidirectional rotation of the pinion gears, input shaft, gear system, drive shaft, and flywheels for the continuous, stable generation of electricity from rotational energy.

Each buoyant member 303 is connected to a corresponding cross 329 and, hence, bevel gear pair by a longitudinal rod 370 which is fixed to the cross 329 at one end and fixed at its opposite end to a second cross 374. The second cross 374 comprises a cross-pin (not shown) which is captured on either end by two sockets 376 formed in the buoyant member 303 body and configured to allow the second cross 374 to rotate relative to the buoyant member 303 about a pitch axis that is substantially parallel to the pitch axis 339 about which each first cross 329 rotates. Accordingly, each buoyant member 303 is able to pivot relative to the connecting rod 370 so that each buoyant member 303 can resonate along the water surface with each passing wave. The reciprocating motion of the buoyant members 303 on the water surface is translated to rotational movement of the cross-pins 330 about the pitch axis 339 so that the appropriately oriented bevel gears rotate with the cross-pins 330 and drive the corresponding pinion and input shafts to rotate, thereby driving the gear systems 319, drive shafts, flywheels 321 and electric generators 323.

Figure 29:
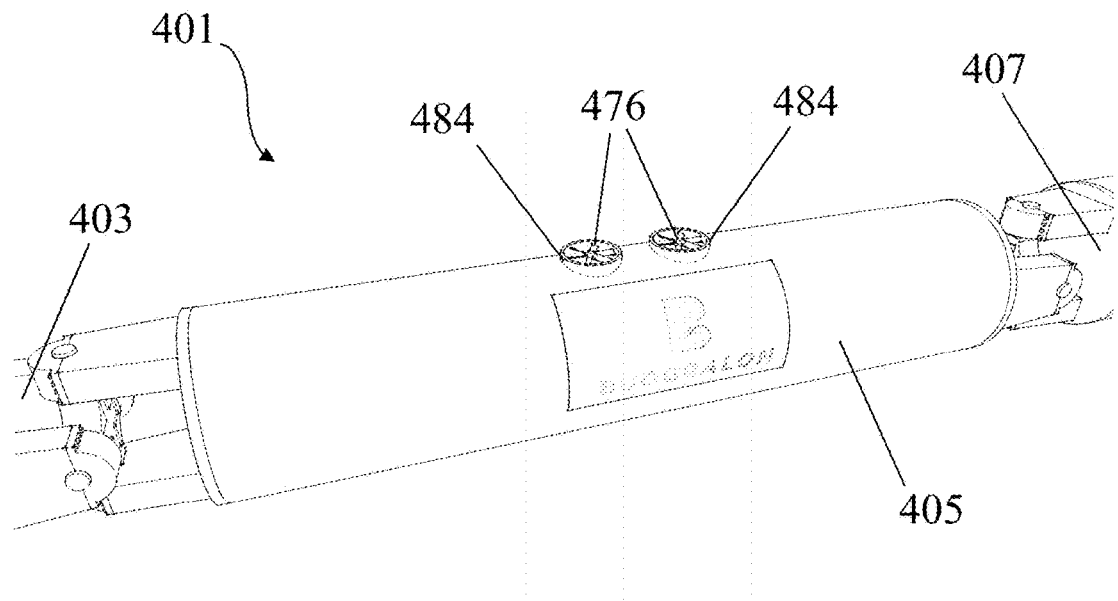
FIG. 29 shows part of an alternative wave energy converter for removing carbon from the air.
Figure 30:
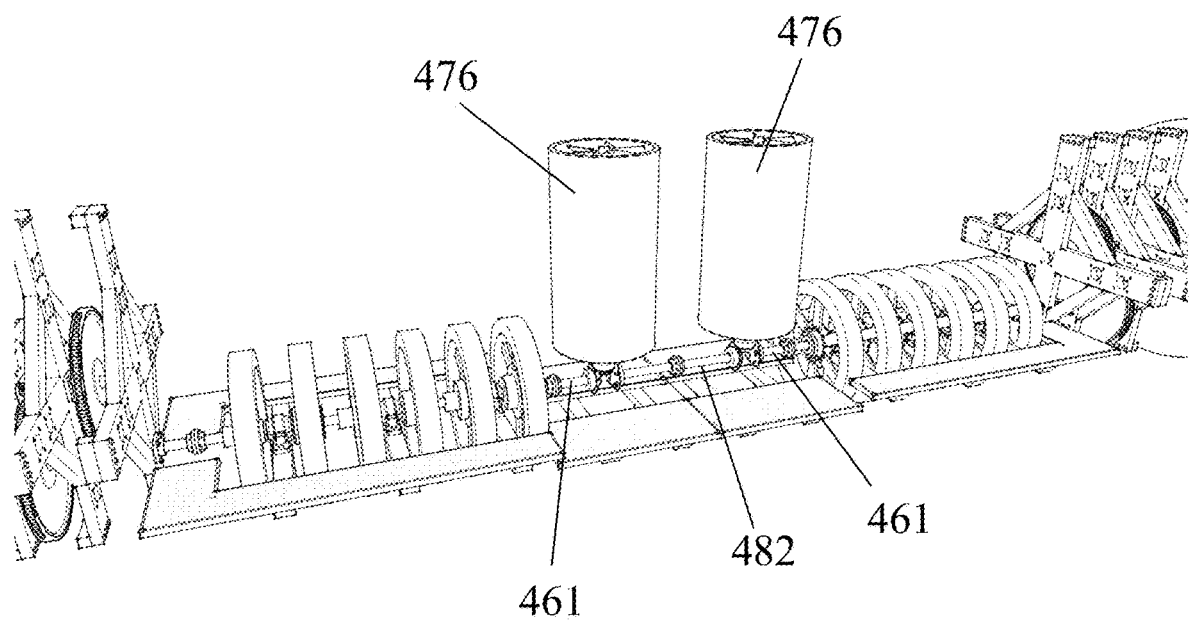
FIG. 30 shows the part shown in FIG. 29 with an outer shell removed to reveal internal components.
Figure 31:
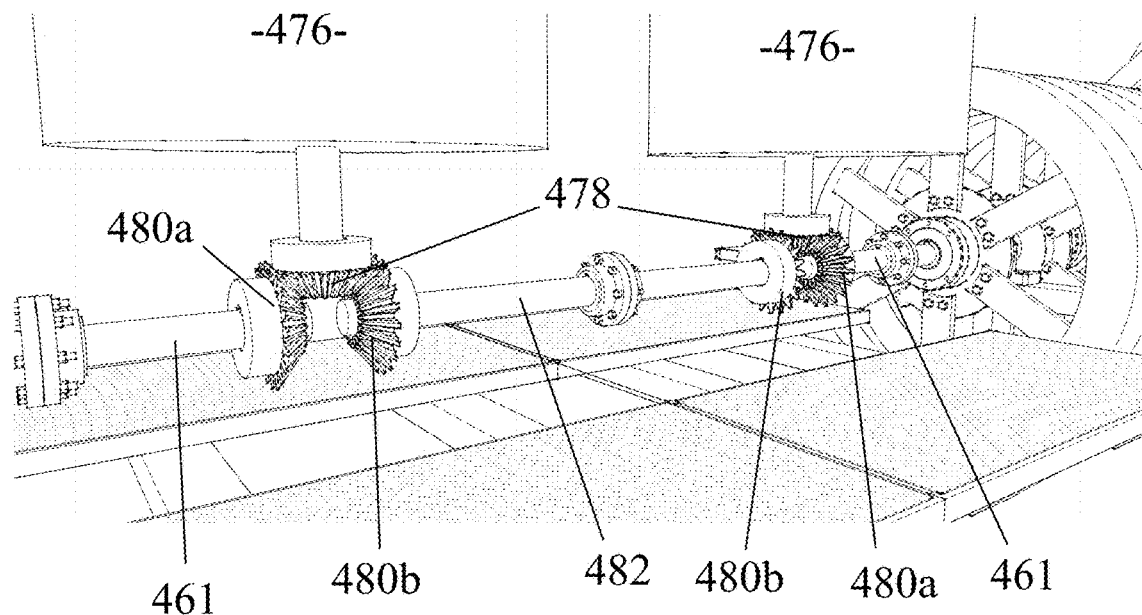
FIG. 31 shows a close up of air extraction components of the part shown in FIG. 30.
Figure 32:
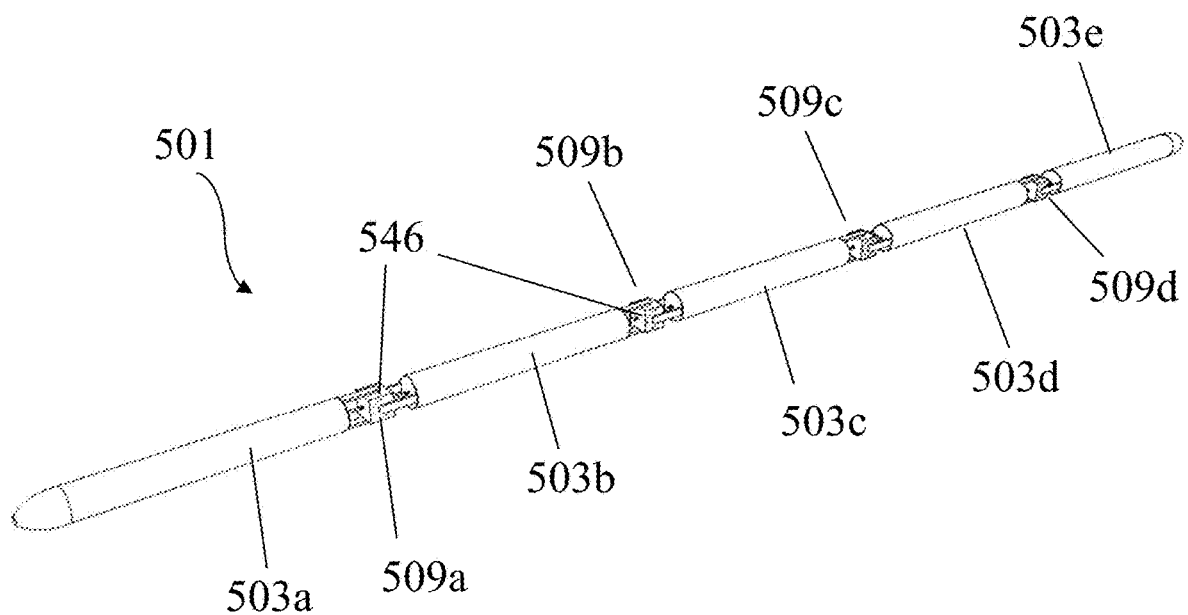
FIG. 32 shows a wave energy converter according to another example of the present disclosure.
Figure 33:
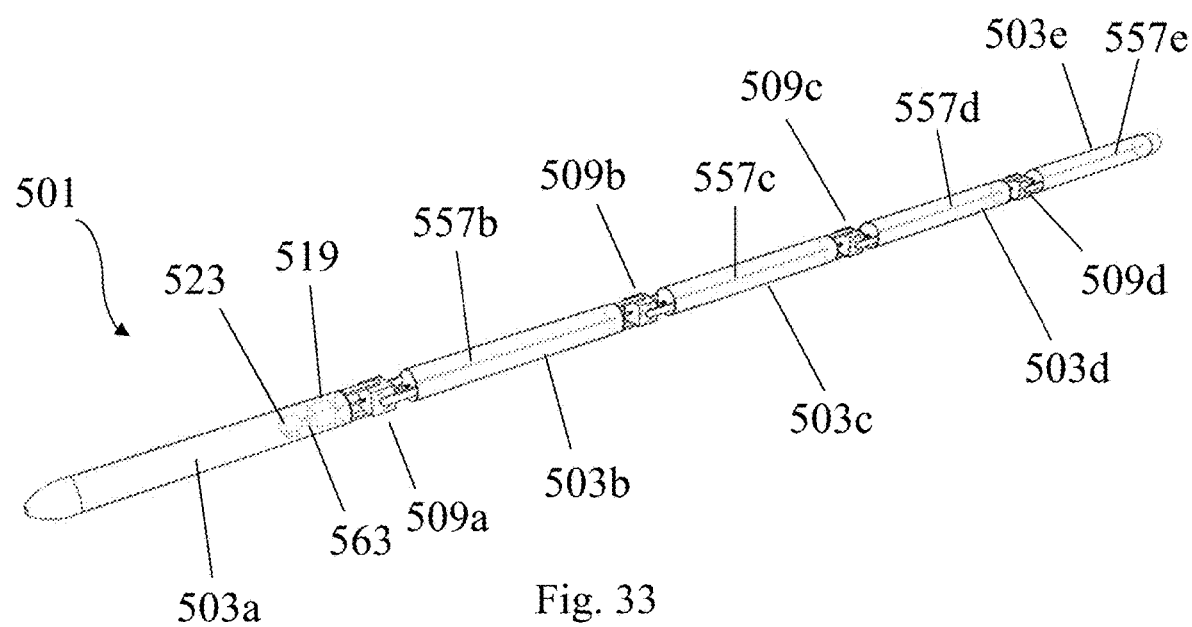
FIG. 33 shows the wave energy converter of FIG. 32 with parts of the housing depicted as transparent to reveal internal components of the wave energy converter.
Figure 34:
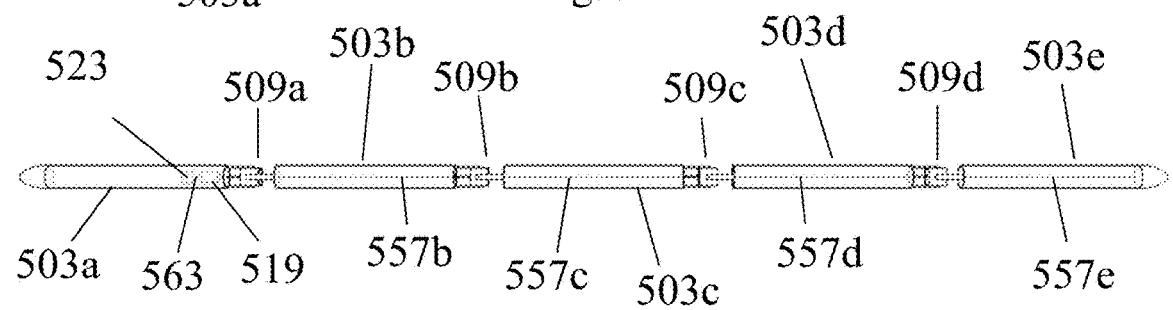
FIG. 34 shows a side view of the wave energy converter shown in FIG. 33.
Figure 35:
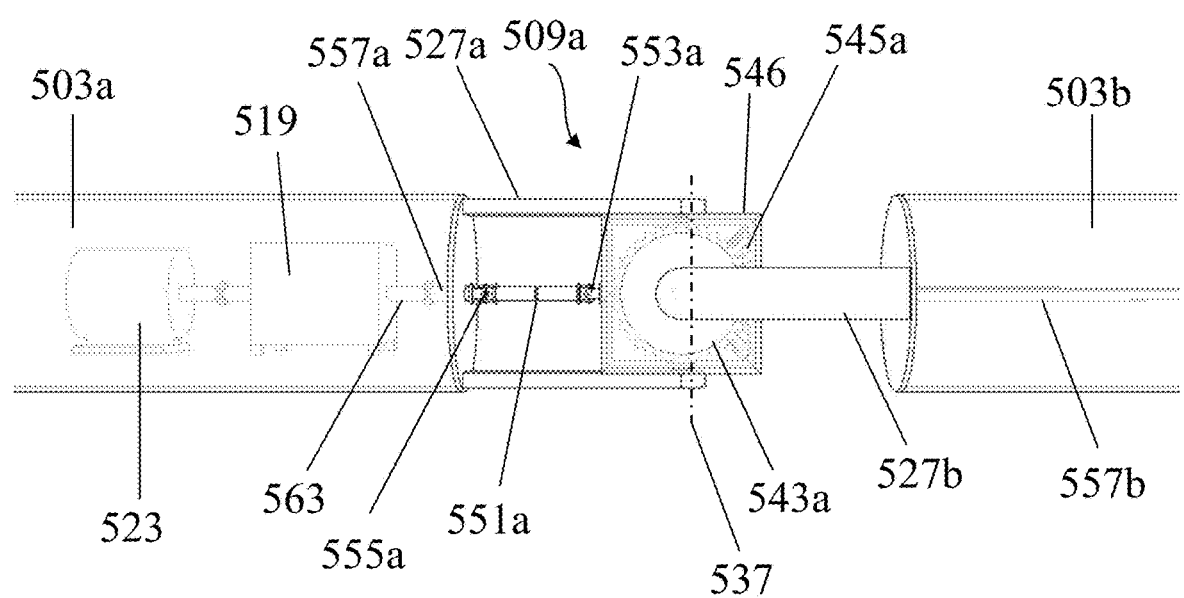
FIG. 35 shows a side view of a universal joint of the wave energy converter shown in FIGS. 32-34 with housing depicted as transparent to reveal internal components of the universal joint associated with the pitch axis of rotation, and a connected gear system and electric generator.
Figure 36:
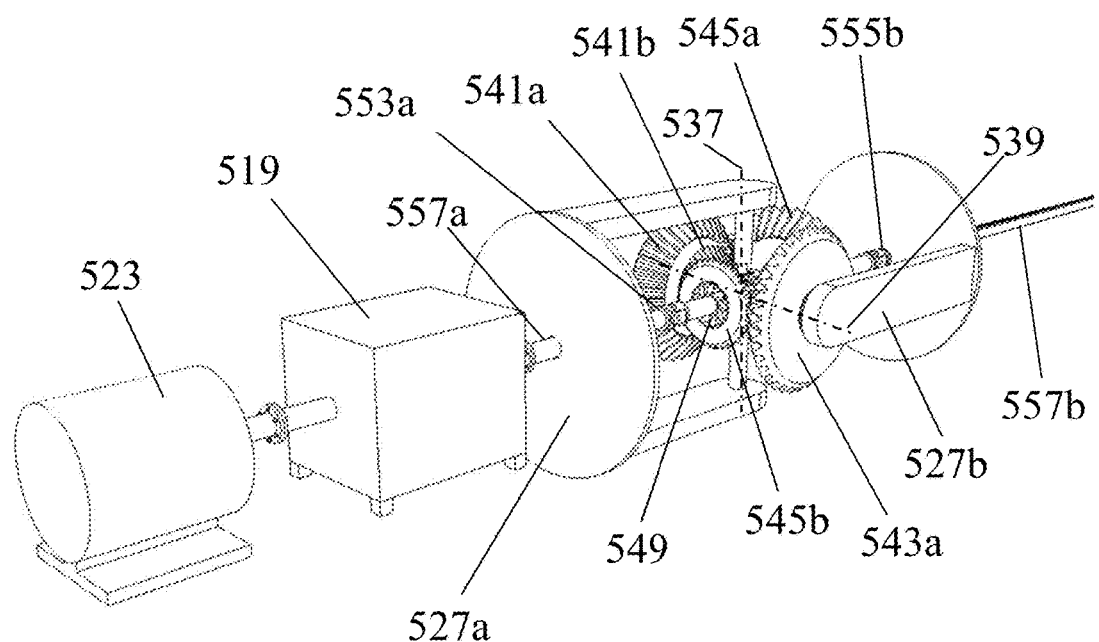
FIG. 36 shows a perspective view of the components shown in FIG. 35 without the external housing of the wave energy converter.
Figure 37:
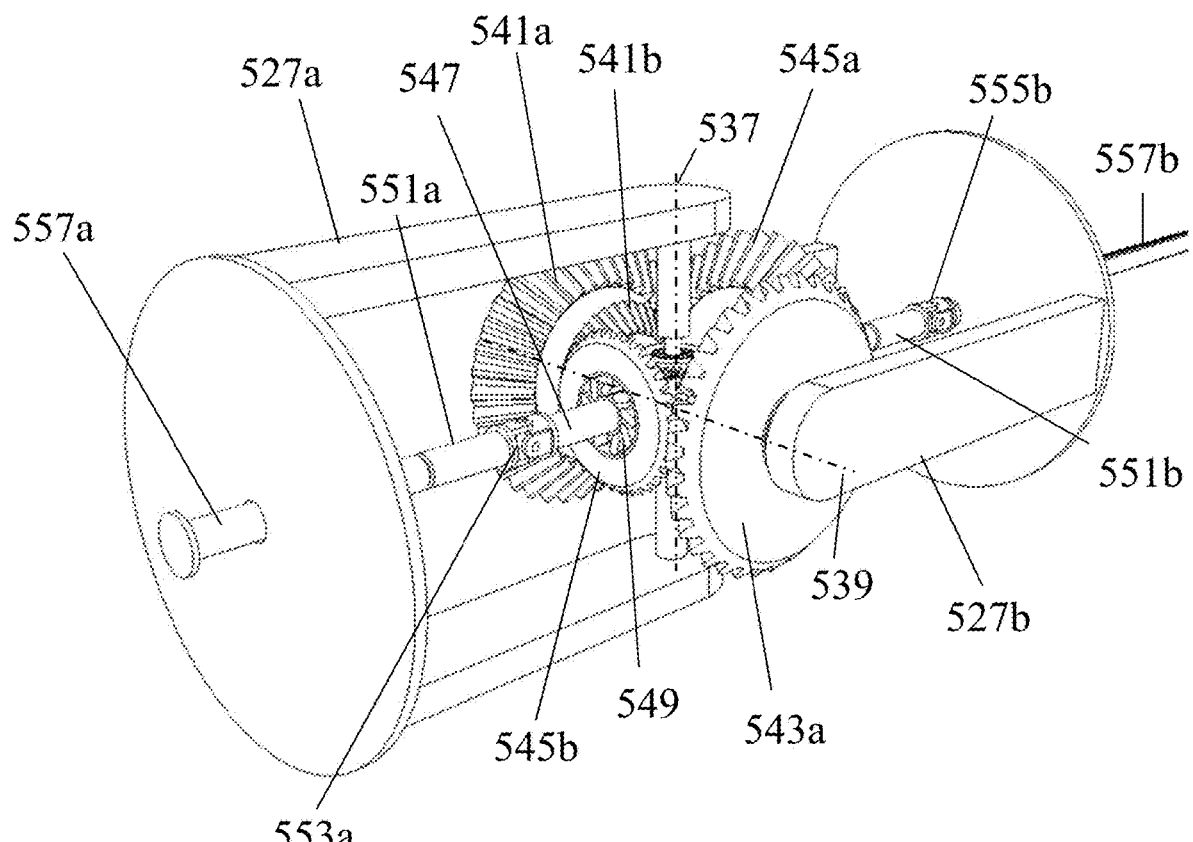
FIG. 37 shows a perspective view of the components of the universal joint shown in FIG. 36.

Not only can a WEC according to the invention be used for power generation to supply electricity to the grid, but it may also be used for water desalination, breakwater applications and even carbon capture. Referring to FIG. 31, in a further alternative embodiment of a WEC 401, the electricity generators may be replaced by one or more suction fans 476 for the intake of air for carbon capture processing. In all other respects, the configuration and operation of the WEC 401 is the same as that of the first described WEC embodiment 1. In the embodiment depicted in FIGS. 29 to 31, a pair of suction fans 476 is provided, each of which is connected to the drive shaft 461 by a pinion 478 of the suction fans 476 meshing with a pair of interfacing bevel gears 480a, 480b that are rotatable in opposite directions about the axis of rotation of the drive shaft 461. When the drive shaft 461 is driven to rotate by relative movement between two interconnected members 403, 405, 407 each bevel gear 480a connected to a corresponding drive shaft 461 rotates with the drive shaft 461 and forces the pinion 478 and, hence, the fan 476 to rotate. Rotation of the pinion 478 also urges the other bevel gear 480b of each pair to rotate in the opposite direction about the axis of rotation of the drive shaft 461. The inner bevel gears 480b of each pair are linked by a central shaft 482 so that both fans 476 are driven to rotate regardless of which end of a member 405 pivots relative to an adjacent, connected member 403, 407.

Each fan 476 extends upwardly when the WEC 401 is appropriately oriented in the water and is exposed to the outside environment via a pair of corresponding port holes 484 formed in the roof of a member body. Accordingly, upon operation of the WEC 401 when subjected to water waves, the suction fans 476 are driven to draw in ambient air from the atmosphere so that harmful $CO_2$ can be chemically scrubbed from the air for later storage.

With reference to FIGS. 32 to 42, there is shown an alternative embodiment of an offshore wave energy converter (WEC) 501 operable to float on the surface of the ocean or sea and to bend and flex to generate electricity when subjected to the kinetic energy of water waves. In the embodiment depicted, the WEC 501 comprises five interconnected buoyant members 503a-e connected in series. Each buoyant member 503a-e is pivotally connected to an adjacent buoyant member by a universal joint 509a-d so as to permit 2-degrees of relative movement between adjacent connected members 503a-f so that the WEC 501 can generate electricity when acted upon by waves from all directions.

Each buoyant member 503a-e comprises a substantially cylindrical, hollow body made predominantly from steel. In the present embodiment, each universal joint 509a-d comprises a pair of yokes 527a, 527b which extend from respective ends of two adjacent buoyant members 503a, 503b. Depending on the orientation of the WEC 501, one yoke 527a forms a pitch yoke i.e., configured for relative rotation about a side-to-side axis, and one yoke 527b forms a yaw yoke, i.e., configured for relative rotation about the traverse axis. Each yoke 527a, 527b comprises a pair of pins 530a, 530b extending inwardly from opposite sides respectively of the yoke 527a, 527b along a common axis. Each pair of pins 530a, 530b terminates before meeting, thereby creating a gap between the pins in each pair 530a, 530b. Accordingly, in the present embodiment, each pair of pins 530a, 530b in the universal joint 509a-d forms an axis of rotation 537, 539 that is substantially perpendicular to the other. In the orientation depicted in FIGS. 32 to 38, the first axis of rotation 537 is intended to form the yaw axis (i.e., for relative rotation about a side-to-side axis) and the second axis of rotation 539 is intended to form the pitch axis (i.e., for relative rotation about the traverse axis).

Figure 38:
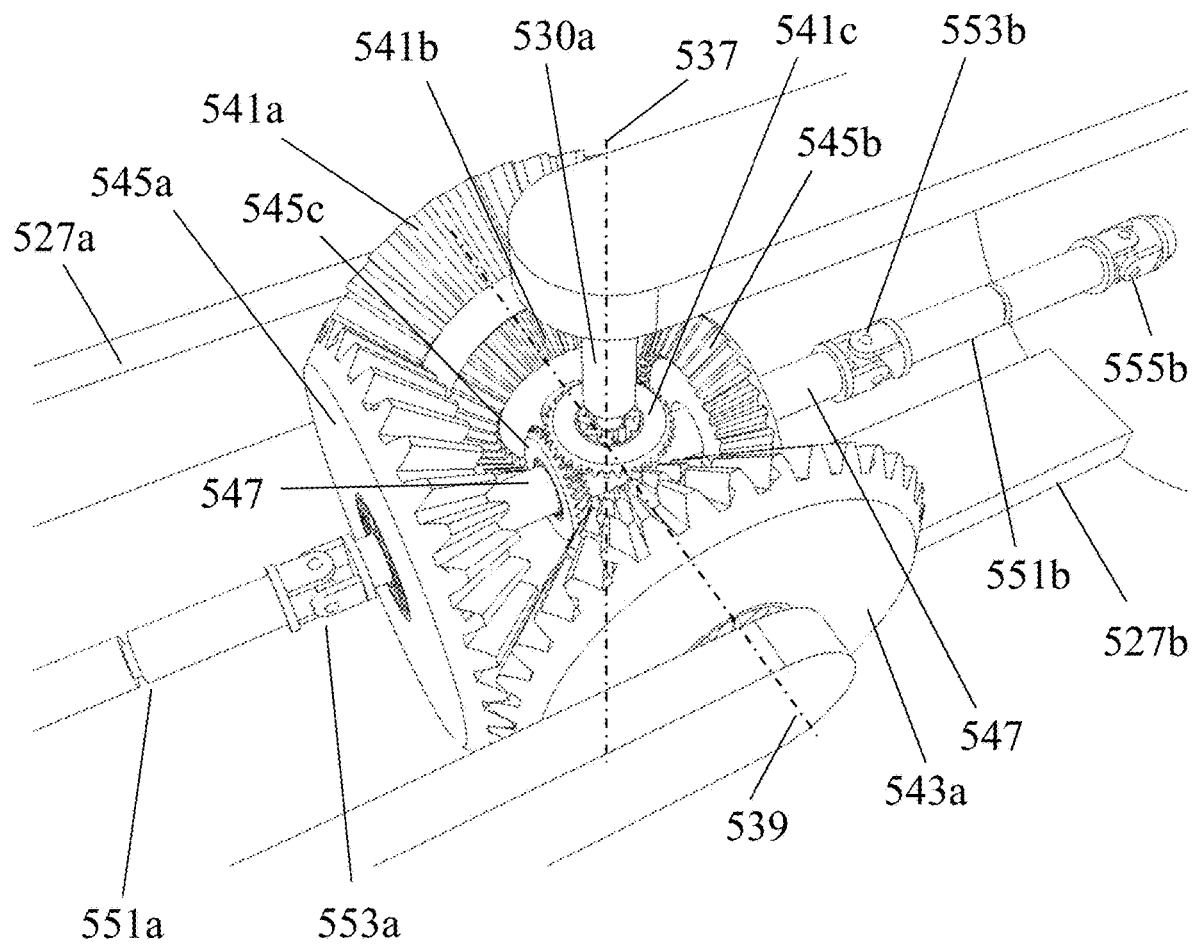
FIG. 38 shows a perspective view of the components of the universal joint shown in FIG. 37 including a bevel gear mounted to the yaw axis and a corresponding meshing bevel gear mounted to an input shaft of the universal joint.

The pins in each pair 530a, 530b form mountings for one or more corresponding pairs of bevel gears which may be arranged to rotate about the associated axis of rotation 537, 539. In the present embodiment, two pairs of bevel gears are arranged to rotate about the pitch axis of rotation 539, and one pair of bevel gears are arranged to rotate about the yaw axis of rotation 537. For each axis of rotation 537, 539, a pair of bevel gears comprises two spaced apart bevel gears 541a-c, 543a-c that are arranged such that the tooth-bearing sides face one another. For the pitch axis of rotation, one pair of bevel gears comprises two spaced apart larger diameter bevel gears 541a, 543a and the other pair of bevel gears comprises two spaced apart smaller diameter bevel gears 541b, 543b. The spacing between the larger diameter bevel gears 541a, 543a is greater than the spacing between the smaller diameter bevel gears 541b, 543b such that the smaller diameter gears 541b, 543b are positioned within the spacing of the larger diameter gears 541a, 543a. Referring to FIG. 38, for the yaw axis of rotation 537, the pair of bevel gears comprises two spaced apart bevel gears (underside bevel gear not shown) 541c which are smaller in diameter than the two smaller diameter pitch axis bevel gears 541b, 543b mounted on the pitch axis so as not to encroach one another.

For the present embodiment, the pitch axis 539 is associated with two sets of bevel gears, while the yaw axis 537 is associated with one set of bevel gears. Consequently, the WEC 501 is primarily configured to capture wave energy through the rotation of adjacent buoyant members about the pitch axis 539. It is therefore desirable for the WEC 501 to maintain the orientation depicted in FIG. 34, ensuring the pitch axis 539 remains the axis with two pairs of bevel gears. To achieve this, ballasts (not shown) are provided at the bottom side or flooring of the buoyant members 503a-e. These ballasts ensure that the buoyant members 503a-e return to the preferred orientation even after exposure to very high energy waves that may temporarily roll the WEC 501 into an undesirable orientation.

Each bevel gear 541a-c, 543a-c of each pair of bevel gears is associated with a one-way mechanism, such as a sprag clutch 549, that permits rotation of the associated bevel gear within its plane of rotation in a first direction of rotation and restricts rotation in the second direction opposite the first direction of rotation such that the bevel gears 541a-c, 543a-c are fixed with respect to the associated cross-pin 530a, 530b. For each pair of bevel gears, one bevel gear 541a-c and sprag clutch 549 combination is configured to freely rotate in a first direction and the other bevel gear 543a-c and sprag 549 clutch combination of the bevel gear pair is configured to freely rotate in a second direction opposite the first direction within its respective plane of rotation.

With particular reference to FIG. 38, three unidirectional drive bevel gears 545a, 545b, 545c of different diameters are mounted on a common input shaft 547 and arranged to rotate in the same direction. Accordingly, upon rotation, the drive gears 545a-c are configured to drive the input shaft 547 in the same direction. The input shaft 547 is spaced 90 degrees apart from the associated cross-pins 530a, 530b such that the input shaft 547 is substantially perpendicular to the corresponding axes of rotation 537, 539. One of the drive gears, 545a, has a larger diameter than the other drive gears 545b, 545c. Drive gear 545b has a mid-sized diameter, while drive gear 545c has a smaller diameter. As can be seen most clearly from FIGS. 32 and 36, each universal joint 509a-d further comprises a cuboid shaped housing 546 which is shaped and configured to contain the bevel gears 541a-c, 543a-c and drive gears 545a-c and protect the internal components from the elements.

The position, orientation, tooth number and diameter of the larger drive gear 545a is chosen so as to mesh with both of the larger bevel gears 541a, 543a of the pitch axis of rotation 539. The position, orientation, tooth number and diameter of the mid-sized drive gear 545b is chosen so as to mesh with the smaller bevel gears 541a, 543a of the pitch axis of rotation 539. The position, orientation, tooth number and diameter of the smaller drive gear 545c is chosen so as to mesh with the bevel gears 541c, 543c of the yaw axis of rotation 537. This arrangement is advantageous as it requires only a single input shaft 547 and three drive gears 545a, 545b, 545c unlike the first described embodiment which requires four input shafts and four drive gears. By utilizing fewer components, the invention enhances the efficiency of the WEC 501 with lower friction losses and higher power transmission efficiency, lowers the risk of failure, and reduces overall manufacturing costs.

Figure 39:
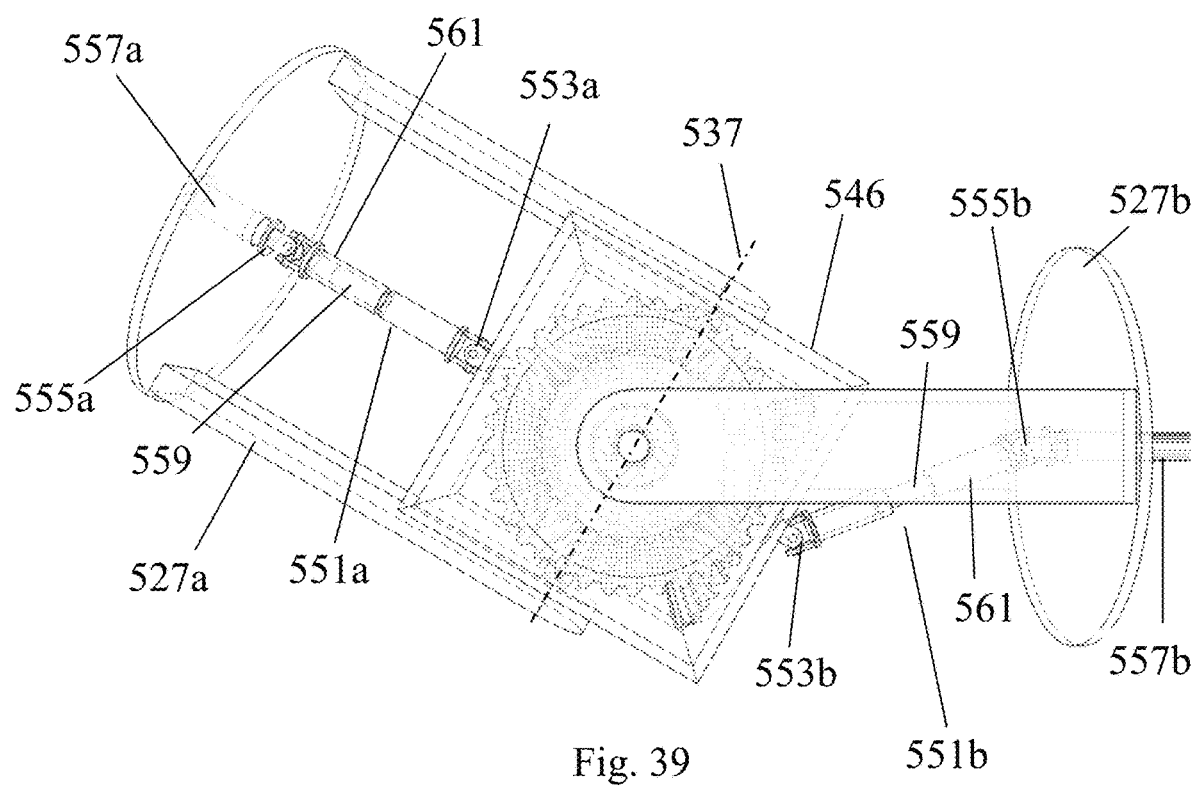
FIG. 39 shows a side view of the universal joint shown in FIG. 37 when subject to relative rotation about the pitch axis. The figure has a degree of transparency to reveal internal components of the universal joint.

Each end of the input shaft 547 is connected to a telescopic shaft segment 551a-b by a first universal shaft joint 553a-b permitting 2-degrees of relative movement between the input shaft 547 and the adjacent telescopic shaft segments 551a-b. The opposite end of each telescopic shaft segment 551a-b is connected to a main shaft segment 557a-e by a corresponding second universal shaft joint 555a-b. With particular reference to FIG. 39, each telescopic shaft segment 551a-b comprises two concentric tubular sections 559, 561 whereby an inner tubular section 559 slides within an outer tubular section 561. The inner and outer tubular sections 559, 561 are fitted with splines (i.e., ridges or teeth) that mesh together so that the tubular sections 559, 561 can slide relative to one another while transmitting torque. Accordingly, the length of each telescopic shaft segment 551a-b may change with relative movement between the adjacent interconnected buoyant members 503a-e and the splines ensure that even when the telescopic shaft segment 551a-b is extended, it can still transmit rotational force from the input shaft 547 end to a main shaft segment 557a-e without slipping.

Each main shaft segment 557a-e extends through the inside of a corresponding buoyant member 503a-e along the longitudinal axis. Where the buoyant member 503a, 503e is an end section of the WEC 501, the associated main shaft segment 557a-e is connected at one end to an adjacent universal joint 509a, 509d. Where the buoyant member 503b-c is a middle section of the WEC 501, the associated main shaft segment 557b-d is connected at each end to an adjacent universal joint 509b-c. Accordingly, the interconnected main shaft segments 557a-e, telescopic shaft segments 551a-b, and input shafts 547 together form a singular segmented shaft configured such that each segment can rotate in only one direction, with all segments rotating in the same direction relative to their own longitudinal axes. This unidirectional rotation ensures that when torque is applied to any input shaft 547 of a corresponding universal joint 509a-d, it transfers through the entire segmented shaft uniformly, preventing any segment from rotating counter to the intended direction.

The front member 503a of the Wave Energy Converter (WEC) 501 houses a gear system 519 and an electric generator 523, although a gear system and corresponding electric generator could also be housed in the rear member 503e as a backup. These components are connected to the singular segmented shaft of the WEC 501 via a drive shaft 563. The drive shaft 563 is configured to rotate in response to the torque applied by the segmented shaft when the WEC 501 is subjected to the kinetic energy of incoming water waves. Similar to the first described embodiment, the gear system 519 features a gear reduction mechanism designed to convert the low-speed rotation of the segmented shaft into higher rotational speeds, optimizing the performance of the electric generator 523. Additionally, the use of gears can provide torque multiplication, enhancing the capability of the WEC 501 to handle varying loads including when subjected to relatively high energy water waves. Since electricity transmission from the WEC 501 to the onshore grid requires high voltage electric cables along the seabed, the WEC 501 may additionally or alternatively be equipped with wireless electricity distribution technology for the wireless transmission of energy in the form of electromagnetic waves from the WEC 501 to a wireless receiver connected to the onshore grid.

In use, the rotational energy for generating electricity is derived from the kinetic energy of the waves through the relative movement between adjacent buoyant members 503a-e when the WEC 501 is subjected to one or more water waves. This relative movement is facilitated by the universal joints 509a-d, which allow the buoyant members 503a-e to rotate about both the yaw axis 537 and the pitch axis 539. Depending on the direction of this relative movement, the corresponding bevel gears 541a-c and 543a-c may be driven to rotate within their respective planes, subsequently driving the connected drive gears 545a and 545b. The rotation of these drive gears 545a, 545b causes the input shaft 547, and thus the segmented shaft as a whole, to rotate, engaging the drive shaft 563, gear system 519 and electric generator 523 to produce electricity. Consequently, the WEC 501 is designed to capture the kinetic energy of the incident waves through the universal joints 509a-e and translate this energy into rotational energy, which drives the electric generator 519 for electricity generation.

Figure 40:
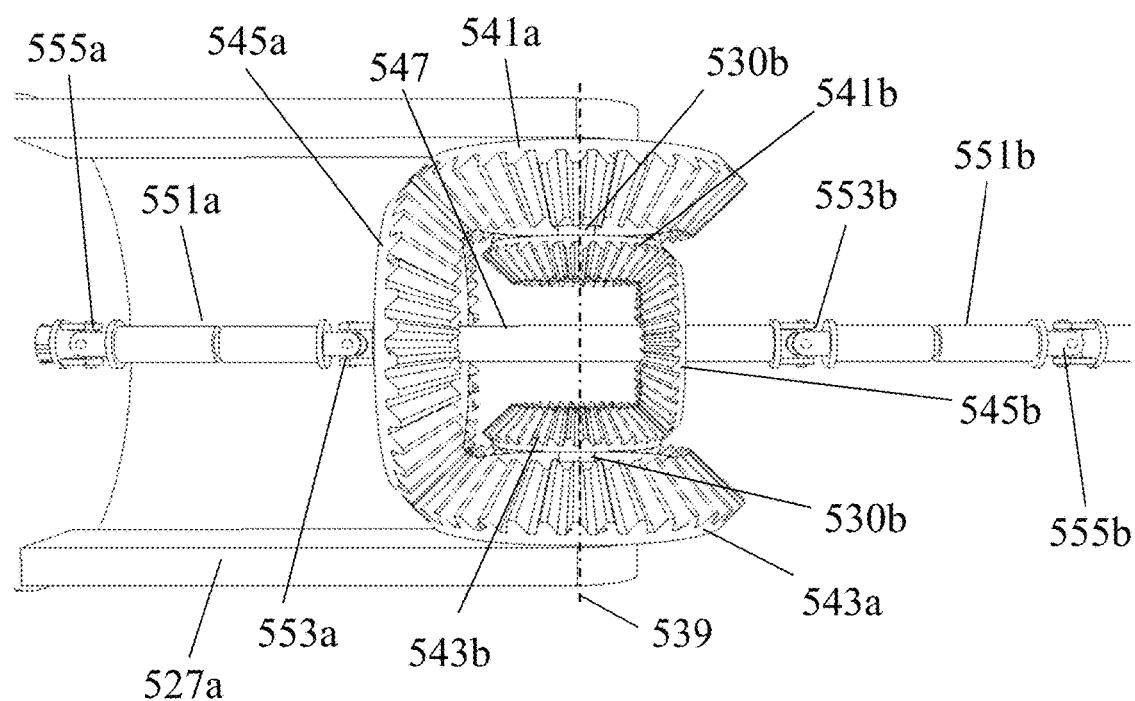
FIG. 40 is a plan view of the components of the universal joint shown in FIG. 39.
Figure 41:
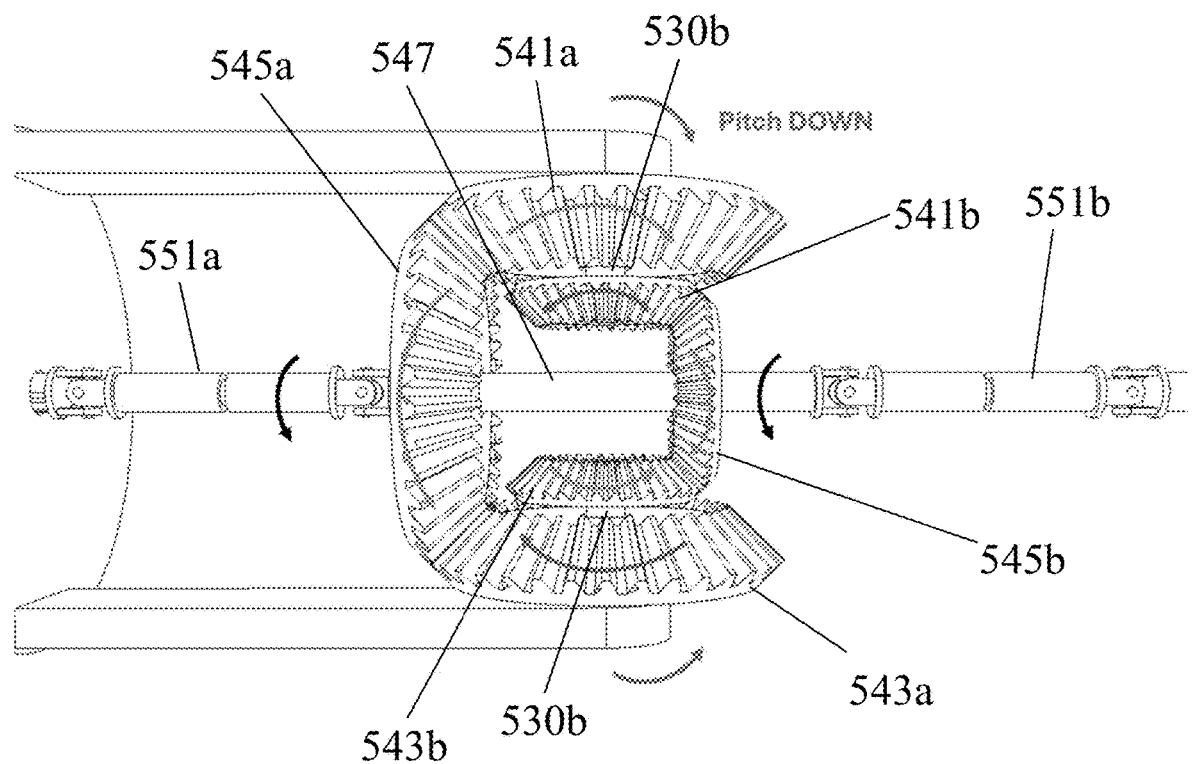
FIG. 41 is a plan view of the components of the universal joint shown in FIG. 40 operating when two interconnected adjacent buoyant members rotate in a first direction about the pitch axis of rotation.
Figure 42:
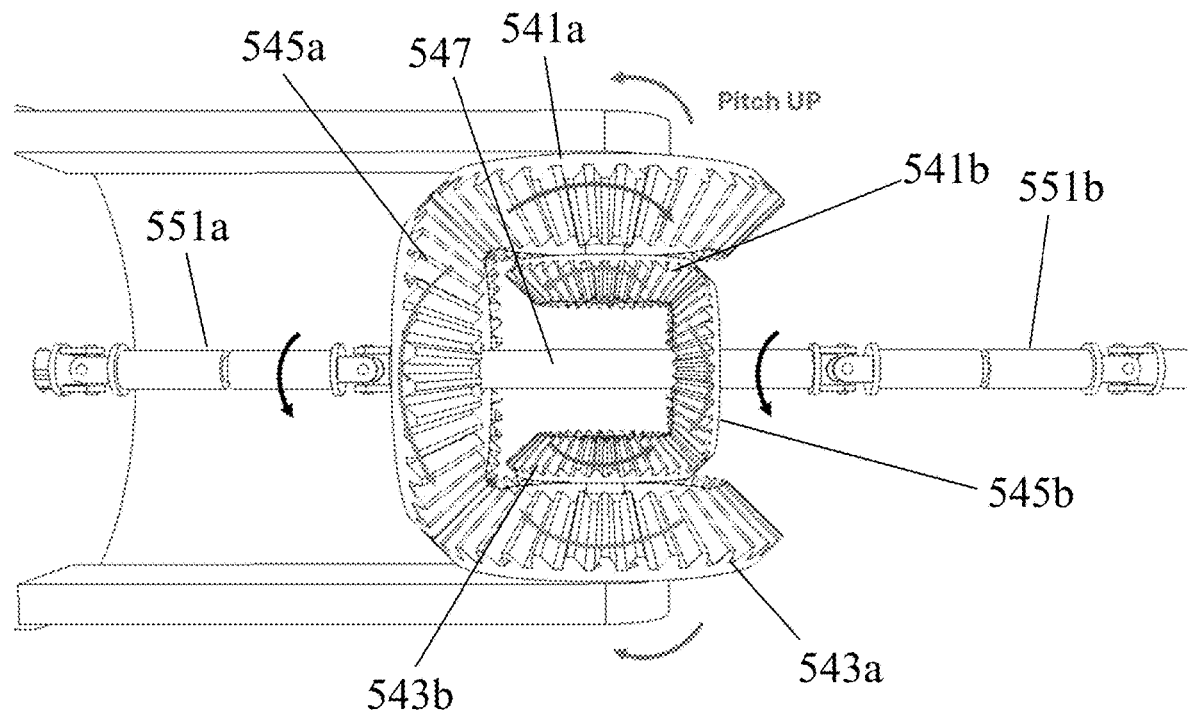
FIG. 42 is a plan view of the components shown in FIG. 40 operating when two interconnected adjacent buoyant members rotate about the pitch axis of rotation in a second direction opposite the first direction of rotation.

For example, Referring to FIGS. 40-42, the universal joint 509a-e components capture kinetic energy from the relative rotation between adjacent buoyant members 503a-e about the pitch axis 347. When the buoyant members 503a-e pitch down (as indicated by arrows in FIG. 41), the larger diameter bevel gear 541a engages with the cross pin 530b through a one-way sprag clutch 549, rotating with the corresponding buoyant member 503a. Meanwhile, the sprag clutch 549 of the other larger diameter bevel gear 543a allows it to freewheel on the mounting pin 530b. This enables the engaged bevel gear 541a to engage with the drive gear 545a, applying torque to the input shaft 547. This torque induces rotation in the segmented shaft, driving the connected gear system 419 and electricity generator 423 to produce electricity. Simultaneously, the smaller diameter bevel gear 543b engages the cross pin 530b via its sprag clutch 549, rotating with the buoyant member 503a, while the sprag clutch 549 of the other smaller diameter bevel gear 541b allows it to freewheel on the mounting pin 530b. Consequently, the engaged bevel gear 543b engages with the associated drive gear 545b, applying torque to the input shaft 547.

Conversely, when the buoyant members 503a-e pitch up (as indicated by arrows in FIG. 42), the larger diameter bevel gear 543a engages the cross pin 530b through its sprag clutch 549, rotating with the buoyant member 503a. The sprag clutch 549 of the other larger diameter bevel gear 541a allows it to freewheel on the mounting pin 530b, permitting the engaged bevel gear 543a to engage with the drive gear 545a and apply torque to the input shaft 547. This torque similarly induces rotation in the segmented shaft, driving the gear system 419 and electricity generator 423 to generate electricity. Concurrently, the smaller diameter bevel gear 541b engages the cross pin 530b via its sprag clutch 549, rotating with the buoyant member 503a, while the sprag clutch 549 of the other smaller diameter bevel gear 543b allows it to freewheel on the mounting pin 530b. This allows the engaged bevel gear 541b to engage with the associated drive gear 545b, applying torque to the input shaft 547 in the same direction. Therefore, the WEC 501 effectively captures the kinetic energy of incident waves and generates electricity, regardless of the direction of relative motion of the adjacent buoyant members about their respective axes of rotation.

It will be appreciated that a single pair of coaxial bevel gears mounted to rotate about the pitch axis 539 is sufficient to capture wave energy regardless of the direction of relative rotation of the interconnected buoyant members 503a-b about the pitch axis 539. However, in the present embodiment, two pairs of coaxial bevel gears are mounted on the pitch axis 539 to maximize the WEC 501's capacity to capture wave energy. This is because the ability of the WEC 501 to capture wave energy is directly proportional to the size of the gear teeth, which is constrained by the spacing between the adjacent arms of each yoke 527a, 527b, and consequently, the maximum diameter of the drive gear 545a-c and the corresponding bevel gears 541a-c, 543a-c. Therefore, the additional pair of coaxial bevel gears provided for a given axis of rotation, such as the pitch axis 539, increases the wave energy capturing capacity of the WEC 501.

The above embodiments are described by way of example only. Many variations are possible without departing from the scope of the invention as defined in the appended claims.

The invention claimed is:

1. An apparatus for extracting power from water waves, comprising:
    one or more pairs of interconnected buoyant members configured for relative movement when subjected to kinetic energy from water waves;
    each of the one or more pairs of interconnected buoyant members being connected by a universal joint permitting rotation between the interconnected buoyant members about a first axis of rotation and a second axis of rotation;
    a first pair of coaxial bevel gears configured to rotate about the first axis of rotation of each of the respective universal joints; and
    a second pair of coaxial bevel gears configured to rotate about the second axis of rotation of each of the respective universal joints;
    wherein each of the first pairs of coaxial bevel gears and each of the second pairs of coaxial bevel gears comprises:
    a first bevel gear configured to rotate in a first direction within its a respective plane of rotation of the respective first bevel gear and restricted from rotating in a second direction opposite the first direction within said respective plane of rotation of the respective first bevel gear; and
    a second bevel gear configured to rotate in the second direction within its a respective plane of rotation of the respective second bevel gear and restricted from rotating in the first direction within said respective plane of rotation of the respective second bevel gear;
    the apparatus further comprising at least one gear system connected to each of the first pairs of coaxial bevel gears and the second pairs of coaxial bevel gears, such that rotation of a bevel gear of at least one of the first pairs of coaxial bevel gears and the second pairs of coaxial bevel gears drives the gear system, the gear system configured to increase the rotational velocity imparted by each of the first pairs of coaxial bevel gears and the second pairs of coaxial bevel gears;
    a drive shaft connected to the gear system and configured to rotate upon activation of the gear system;
    at least one electric generator operatively connected to the drive shaft for generating electricity upon rotation of the drive shaft;
    wherein the apparatus is configured such that relative movement between the one or more pairs of interconnected buoyant members about the first axis of rotation of each of the respective universal joints causes a bevel gear of a the corresponding first pair of coaxial bevel gears to rotate, and
    relative movement between the one or more pairs of interconnected buoyant members about the second axis of rotation of each of the respective universal joints causes a bevel gear of the corresponding second pair of coaxial bevel gears to rotate, thereby driving the gear system to rotate the drive shaft and generate electricity continuously, regardless of the direction of the relative movement between the one or more pairs of interconnected buoyant members.

2. The apparatus as claimed in claim 1, wherein the first pair of coaxial bevel gears of each of the respective universal joints is connected to the gear system by a rotatable element engaging with the first bevel gear or the second bevel gear of the corresponding first pair of coaxial bevel gears and wherein the second pair of coaxial bevel gears of each of the respective universal joints is connected to the gear system by the rotatable element engaging with the first bevel gear or the second bevel gear of the corresponding second pair of coaxial bevel gears.

3. The apparatus as claimed in claim 2, wherein the rotatable element comprises a rotatable shaft.

4. The apparatus as claimed in claim 3, further comprising one or more gears connected to the rotatable shaft and each of the one or more gears being arranged to mesh and engage with at least one bevel gear of the first pair of coaxial bevel gears of each of the respective universal joints or the second pair of coaxial bevel gears of each of the respective universal joints to which the rotatable element is connected.

5. The apparatus as claimed in claim 4, wherein the rotatable shaft comprises two or more pivotally connected segments.

6. The apparatus as claimed in claim 5, wherein at least one segment of the two or more pivotally connected segments is a telescopic segment so that a length of the telescopic segment is adjustable.

7. The apparatus as claimed in claim 6, wherein each of the two or more pivotally connected segments that is the telescopic segment comprises two or more concentric tubes and splines configured to limit relative rotational movement between the two or more concentric tubes so that the two or more concentric tubes can slide relative to one another while transmitting torque.

8. The apparatus as claimed in claim 2, further comprising one or more additional second pairs of coaxial bevel gears configured to rotate about the second axis of rotation of each of the respective universal joints.

9. The apparatus as claimed in claim 1, wherein the first pair of coaxial bevel gears and the second pair of coaxial bevel gears of a the corresponding universal joint is spaced apart about an intersection between the first axis of rotation of the corresponding universal joint and the second axis of rotation of the corresponding universal joint.

10. The apparatus as claimed in claim 1 further comprising a plurality of the pairs of interconnected buoyant members, each buoyant member of the plurality of the pairs of interconnected buoyant members is pivotally connected to at least one adjacent buoyant member of the plurality of the pairs of interconnected buoyant members about at least one axis of rotation defined by a corresponding universal joint.

11. A method of extracting power from water waves comprising the step of positioning the apparatus as claimed in claim 1 in relation to a body of water such that one or more water waves of the body of water act upon at least part of the apparatus to force relative movement between respective parts of the apparatus to drive the first bevel gear and the second bevel gear of the first pair of coaxial bevel gears and the second pair of coaxial bevel gears of each of the respective universal joints for the extraction of power from the water waves.

12. The apparatus as claimed in claim 1, further comprising one or more additional first pairs of coaxial bevel gears configured to rotate about the first axis of rotation of each of the respective universal joints.

13. The apparatus as claimed in claim 1, further comprising one or more additional second pairs of coaxial bevel gears configured to rotate about the second axis of rotation of each of the respective universal joints.

14. A universal joint for an apparatus that extracts power from water waves, comprising:
- interconnected buoyant members configured for relative movement when subjected to kinetic energy from the water waves;
- the universal joint connecting the interconnected buoyant members and permitting rotation between the interconnected buoyant members about a first axis of rotation and a second axis of rotation;
- the universal joint further comprising a first pair of coaxial bevel gears configured to rotate about the first axis of rotation;
- and a second pair of coaxial bevel gears configured to rotate about the second axis of rotation;
- wherein the first pair of coaxial bevel gears and the second pair of coaxial bevel gears each comprise:
- a first bevel gear configured to rotate in a first direction within a respective plane of rotation of the respective first bevel gear and restricted from rotating in a second direction opposite the first direction within said respective plane of rotation of the respective first bevel gear; and
- a second bevel gear configured to rotate in the second direction within a respective plane of rotation of the respective second bevel gear and restricted from rotating in the first direction within said respective plane of rotation of the respective second bevel gear;
- the universal joint further comprising a rotatable element engaging with at least one bevel gear of each of the first pair of coaxial bevel gears and the second pair of coaxial bevel gears;
- wherein the universal joint is configured such that relative movement between the interconnected buoyant members about the first axis of rotation causes one bevel gear of the first pair of coaxial bevel gears to rotate, and
- relative movement between the interconnected buoyant members about the second axis of rotation causes one bevel gear of the second pair of coaxial bevel gears to rotate, thereby causing the rotatable element to rotate continuously in a single direction, regardless of the direction of the relative movement between the interconnected buoyant members.

15. The universal joint as claimed in claim 14, wherein each pair of coaxial bevel gears of the first pair of coaxial bevel gears and the second pair of coaxial bevel gears is spaced apart about an intersection between the first axis of rotation and the second axis of rotation.

16. The universal joint as claimed in claim 14, wherein the rotatable element comprises a rotatable shaft and one or more drive gears arranged to mesh and engage with at least one bevel gear of the first pair of coaxial bevel gears pairs and the second pair of coaxial bevel gears.

17. The universal joint as claimed in claim 16, wherein the rotatable shaft comprises two or more pivotally connected segments.

18. The universal joint as claimed in claim 17, wherein at least one segment of the two or more pivotally connected segments is a telescopic segment so that a length of the respective telescopic segment is adjustable.

19. The universal joint as claimed in claim 18, wherein each of the two or more pivotally connected segments that is the telescopic segment comprises two or more concentric tubes and splines configured to limit relative rotational movement between the two or more concentric tubes so that the two or more concentric tubes can slide relative to one another while transmitting torque.

20. The universal joint as claimed in claim 14, further comprising one or more additional first pairs of coaxial bevel gears configured to rotate about the first axis of rotation of the universal joint.

21. The universal joint as claimed in claim 20, further comprising one or more additional second pairs of coaxial bevel gears configured to rotate about the second axis of rotation of the universal joint.

22. The universal joint as claimed in claim 14, further comprising one or more additional second pairs of coaxial bevel gears configured to rotate about the second axis of rotation of the universal joint.

\* \* \* \* \*